US012603924B2

(12) United States Patent
Nam et al.

(10) Patent No.: US 12,603,924 B2
(45) Date of Patent: Apr. 14, 2026

(54) ELECTRONIC DEVICE, AND METHOD FOR PROCESSING IMS-BASED CALL IN ELECTRONIC DEVICE

(71) Applicant: SAMSUNG ELECTRONICS CO., LTD., Suwon-si (KR)

(72) Inventors: Jihwan Nam, Suwon-si (KR); Changjong Kim, Suwon-si (KR); Chungho Shin, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 293 days.

(21) Appl. No.: 18/241,628

(22) Filed: Sep. 1, 2023

(65) Prior Publication Data

US 2023/0412652 A1 Dec. 21, 2023

Related U.S. Application Data

(63) Continuation of application No. PCT/KR2022/002822, filed on Feb. 25, 2022.

(30) Foreign Application Priority Data

Mar. 4, 2021 (KR) ........................ 10-2021-0029067

(51) Int. Cl.
*H04L 65/1073* (2022.01)
*H04L 65/1016* (2022.01)
(Continued)

(52) U.S. Cl.
CPC ...... *H04L 65/1073* (2013.01); *H04L 65/1016* (2013.01); *H04W 76/10* (2018.02); *H04W 84/042* (2013.01)

(58) Field of Classification Search
CPC ..... H04W 88/04; H04W 12/03; H04W 12/06; H04W 12/75; H04W 36/36; H04W 60/00;
(Continued)

(56) References Cited

U.S. PATENT DOCUMENTS 10,993,161 B2 * 4/2021 Buckley ................. H04W 8/06
2010/0009675 A1 1/2010 Wijting et al.
(Continued)

FOREIGN PATENT DOCUMENTS

KR 20160046213 A 4/2016
KR 20200017307 A 2/2020
(Continued)

OTHER PUBLICATIONS

International Search Report and Written Opinion for International Application No. PCT/KR2022/002822; International Filing Date Feb. 25, 2022; Date of Mailing Jun. 3, 2022; 10 Pages.
(Continued)

*Primary Examiner* — Matthew C Sams
(74) *Attorney, Agent, or Firm* — CANTOR COLBURN LLP

(57) ABSTRACT

According to various embodiments, an electronic device comprises at least one antenna module, at least one short-range communication module, at least one processor and a memory, wherein the memory can store instructions for allowing, during the execution thereof, the processor to: register the electronic device to an IP multimedia subsystem (IMS) server through the at least one antenna module; confirm a short-range communication method capable of a device to device (D2D) connection with at least one first external electronic device; connect, based on identification information about the first external electronic device, with the at least one first external electronic device through the at least one short-range communication module with the confirmed short-range communication method; and process an IMS registration with respect to the first external electronic device in response to an IMS registration request received from the first external electronic device through the at least one short-range communication module.

18 Claims, 25 Drawing Sheets

(51) Int. Cl.
    *H04W 76/10*     (2018.01)
    *H04W 84/04*     (2009.01)

(58) Field of Classification Search
    CPC ......... H04W 76/11; H04W 8/06; H04W 8/26;
                  H04W 84/12; H04W 84/14; H04B
                   7/15592; H04L 63/08; H04L 63/0884;
                   H04L 12/1407; H04L 41/0893; H04L
               41/5022; H04L 65/1016; H04L 65/1069;
                                  H04L 65/80
    See application file for complete search history.

(56) References Cited

U.S. PATENT DOCUMENTS

| | | | |
|---|---|---|---|
| 2011/0243010 A1 | 10/2011 | Geirhofer et al. | |
| 2013/0005377 A1 | 1/2013 | Wang et al. | |
| 2013/0073671 A1* | 3/2013 | Nagpal | H04W 76/14 |
| | | | 709/217 |
| 2014/0094119 A1 | 4/2014 | Stojanovski et al. | |
| 2014/0244747 A1* | 8/2014 | Aggarwal | H04N 21/41407 |
| | | | 709/204 |
| 2014/0348061 A1 | 11/2014 | Salkintzis | |
| 2014/0373123 A1* | 12/2014 | Kang | H04L 41/22 |
| | | | 715/736 |
| 2016/0029423 A1 | 1/2016 | Ke et al. | |
| 2016/0295494 A1* | 10/2016 | Gulati | H04W 72/542 |
| 2017/0064572 A1 | 3/2017 | Subramanian et al. | |
| 2017/0093541 A1* | 3/2017 | Pan | H04W 72/23 |
| 2017/0201567 A1 | 7/2017 | Zises | |
| 2017/0346858 A1 | 11/2017 | Vashi et al. | |
| 2018/0091601 A1 | 3/2018 | Yang et al. | |
| 2018/0324875 A1 | 11/2018 | Kim et al. | |
| 2019/0037518 A1* | 1/2019 | Russell | H04L 65/1016 |
| 2019/0104559 A1 | 4/2019 | Verma et al. | |
| 2019/0268767 A1* | 8/2019 | Wu | H04L 63/162 |
| 2020/0053521 A1 | 2/2020 | Kim et al. | |
| 2020/0213927 A1* | 7/2020 | Buckley | H04W 36/36 |
| 2020/0305211 A1 | 9/2020 | Foti et al. | |
| 2021/0105862 A1* | 4/2021 | He | H04W 76/14 |
| 2022/0302993 A1* | 9/2022 | Hovsepian | H04B 7/10 |
| 2023/0090887 A1* | 3/2023 | Liu | H04W 48/18 |
| | | | 370/329 |
| 2023/0412652 A1* | 12/2023 | Nam | H04L 67/51 |

FOREIGN PATENT DOCUMENTS

| | | | | |
|---|---|---|---|---|
| WO | WO-2017034511 A1 * | 3/2017 | ......... | H04L 12/1407 |
| WO | 2017057954 A1 | 4/2017 | | |

OTHER PUBLICATIONS

India Office Action corresponding to Application No. 202347064156; Issue Dated Nov. 28, 2024.
Korean Office Action corresponding to Application No. 10-2021-0029067; Dated May 16, 2025.
Supplementary European Search Report corresponding to Application No. 22763545; Dated Jan. 22, 2024.

\* cited by examiner

ELECTRONIC DEVICE, AND METHOD FOR PROCESSING IMS-BASED CALL IN ELECTRONIC DEVICE

CROSS-REFERENCE TO RELATED APPLICATIONS

This application is a continuation application, claiming priority under § 365(c), of International Application No. PCT/KR2022/002822, filed on Feb. 25, 2022, which is based on and claims the benefit of Korean patent application number 10-2021-0029067 filed on Mar. 4, 2021, in the Korean Intellectual Property Office, the disclosures of which are incorporated by reference herein in their entireties.

TECHNICAL FIELD

Various embodiments of the disclosure relate to an electronic device, and a method for processing an IMS-based call in the electronic device.

BACKGROUND

As the wireless communication system develops, the wireless communication system may provide Internet protocol (IP)-based multimedia services (e.g., voice, video, and data) to electronic devices. For example, electronic devices may be provided with voice, video, and/or other media services through an IP multimedia subsystem (IMS) server.

BRIEF DESCRIPTION

According to various embodiments, when a user uses a plurality of electronic devices (e.g., a smartphone, a smartwatch, or a tablet), an incoming call made to an electronic device (e.g., a smartphone) may be received through another electronic device (e.g., a smartwatch or a tablet), or a call may be transmitted through another electronic device.

For example, by connecting the smartphone and the smartwatch through Bluetooth by a separately defined protocol, call transmission and reception on the smartphone may be linked to the smartwatch. In this case, because the smart watch is not registered to the IMS server and cannot use the IMS protocol, service expansion may be difficult. As another example, the smartwatch may be provided with an IMS service linked with a smartphone by registering it with a separate server that provides a call forking service together with the electronic device. Even if the call forking service may be provided to the smartwatch, if the user moves to an area where the separate server is not provided, the smartwatch cannot use the IMS protocol and cannot receive the IMS service.

Various embodiments may provide an electronic device capable of providing a call forking service for an electronic device not subscribed to an IMS service through an electronic device subscribed to the IMS service and a method of processing an IMS-based call in the electronic device by connecting a plurality of electronic devices through device to device (D2D) communication, and by processing IMS registration of the electronic device (e.g., a smartwatch and a tablet) not subscribed to the IMS service by the electronic device (e.g., a smartphone) subscribed to the IMS service by using the connected D2D communication.

According to various embodiments, an electronic device may include at least one antenna module, at least one short-range communication module, at least one processor connected to the antenna module and the at least one short-range communication module, and a memory connected to the at least one processor, and the memory, during the execution thereof, may store instructions which cause the processor to register the electronic device to an IP multimedia subsystem (IMS) server through the at least one antenna module, identify a short-range communication method capable of a D2D connection with at least one first external electronic device, connect, based on identification information of the first external electronic device, with the at least one first external electronic device through the at least one short-range communication module, with the identified short-range communication method, and process an IMS registration for the first external electronic device in response to an IMS registration request received from the first external electronic device through the at least one short-range communication module.

According to various embodiments, a method for processing an IMS-based call in an electronic device may include registering the electronic device to an IP multimedia subsystem (IMS) server, identifying a short-range communication method capable of a device to device (D2D) connection with at least one first external electronic device in response to identification of the D2D call service activation, connecting, based on identification information of the first external electronic device, to the at least one first external electronic device through at least one short-range communication module, with the identified short-range communication method, and processing an IMS registration for the first external electronic device in response to an IMS registration request received from the first external electronic device through the at least one short-range communication module.

According to various embodiments, an electronic device may provide a call forking service through an electronic device subscribed to an IMS service by connecting a plurality of electronic devices through device to device (D2D) communication, and by processing IMS registration of an electronic device not subscribed to the IMS service by the electronic device subscribed to the IMS service through the D2D communication.

According to various embodiments, an electronic device may provide a call forking service through an electronic device subscribed to an IMS service by registering an electronic device not subscribed to the IMS service with the IMS service without a separate server that provides the call forking service.

DETAILED DESCRIPTION

Figure 1:
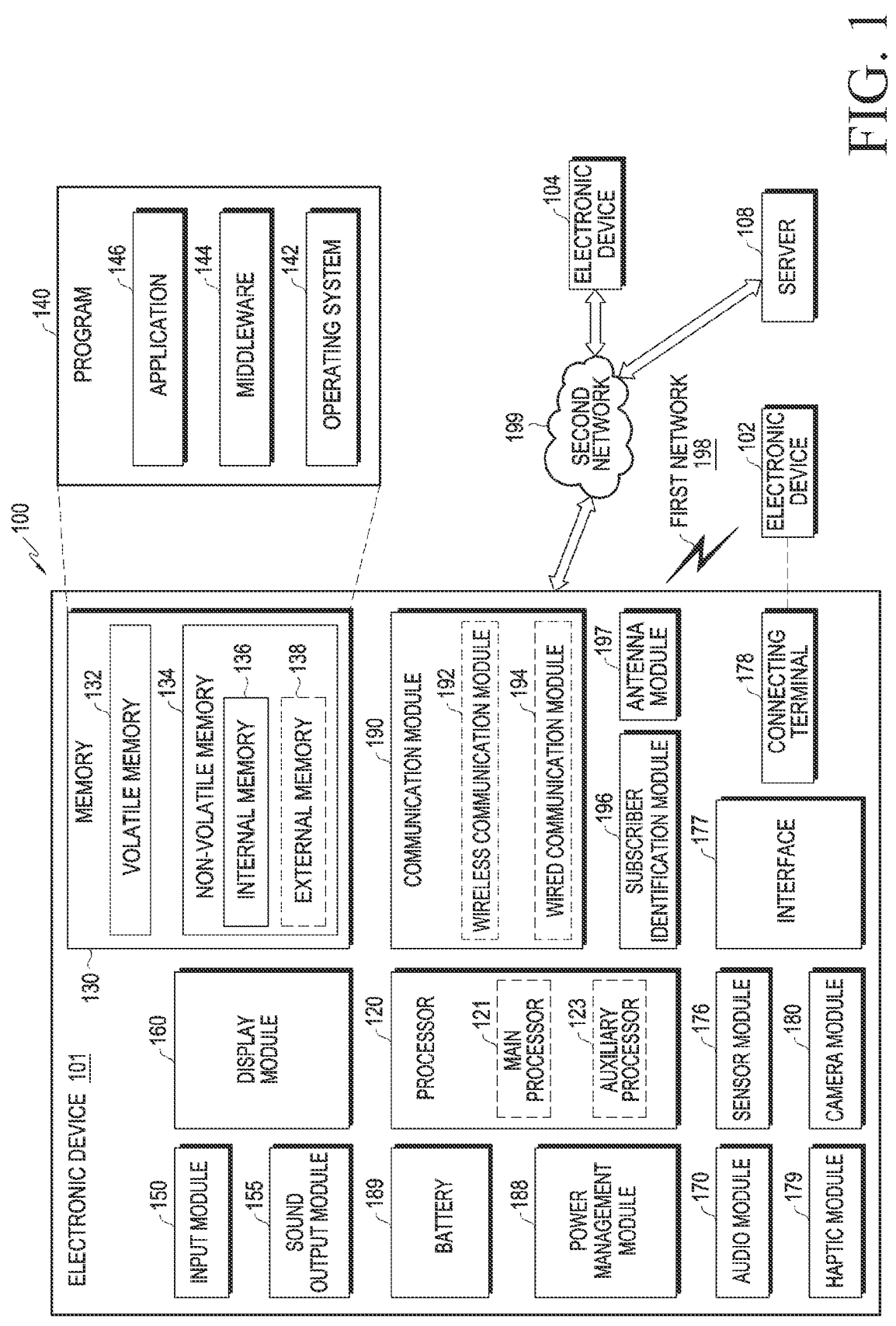
FIG. 1 is a block diagram of an electronic device in a network environment according to various embodiments.

Hereinafter, embodiments of the disclosure will be described in detail with reference to the accompanying drawings. In describing various embodiments of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Furthermore, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Moreover, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

A singular expression used herein may include a plural expression unless they are definitely different in the context. As used herein, such an expression as "comprise" or "include" should not be interpreted to necessarily include all elements or all steps described in the specification, and should be interpreted to be allowed to exclude some of them or further include additional elements or steps.

The terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Further, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

In the following, a terminal will be described in the drawings, but the terminal may also be called an electronic device, a terminal device, a mobile equipment (ME), a user equipment (UE), a user terminal (UT), a subscriber station (SS), a wireless device, a handheld device, or an access terminal (AT). Furthermore, the terminal may be a device having a communication function, such as a mobile phone, a personal digital assistant (PDA), a smartphone, a wireless modem, or a notebook.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as BluetoothTM, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
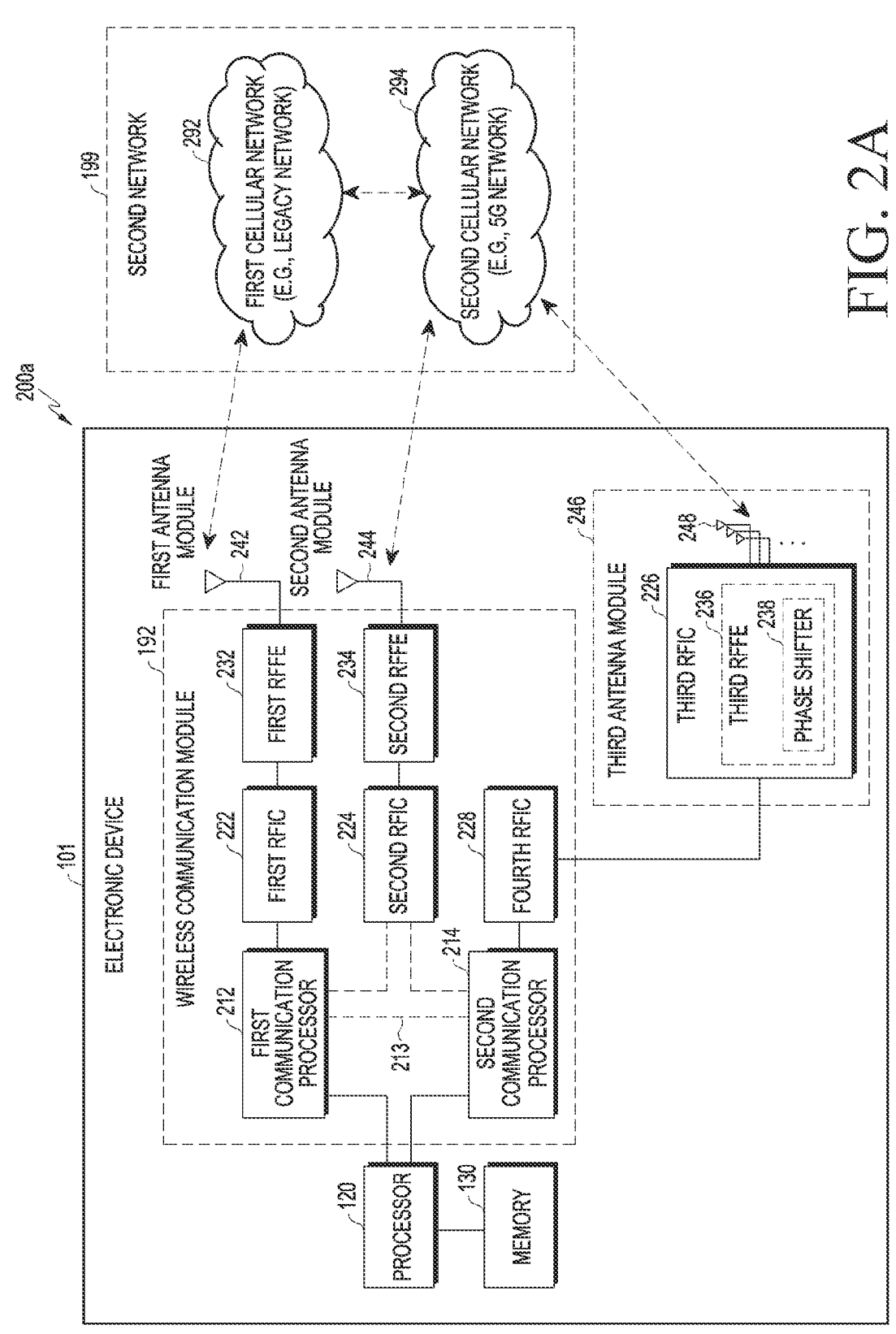
FIG. 2A is a block diagram of an electronic device for supporting legacy network communication and 5G network communication according to various embodiments.
Figure 2B:
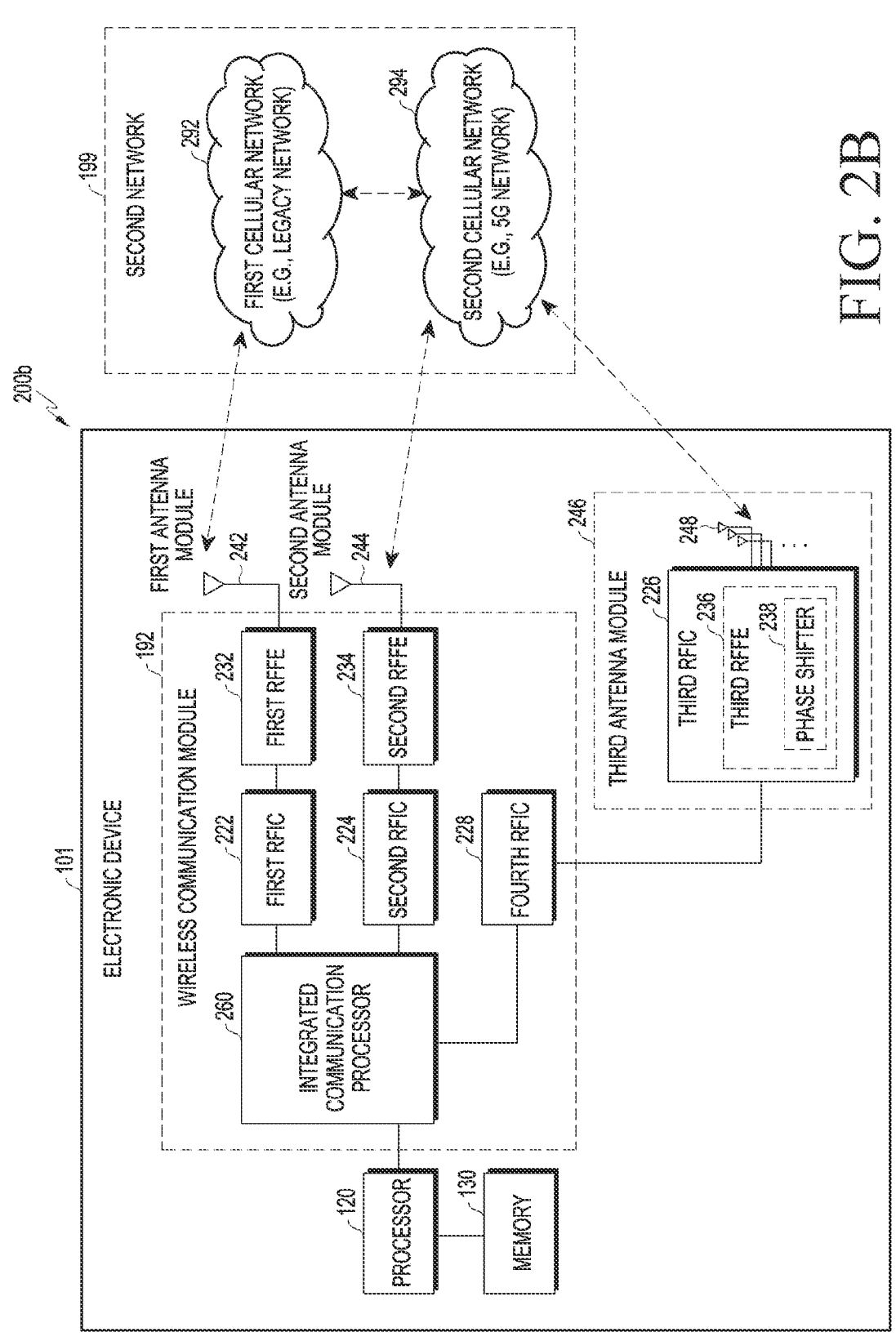
FIG. 2B is a block diagram of an electronic device for supporting legacy network communication and 5G network communication according to various embodiments.

FIG. 2A is a block diagram 200*a* of an electronic device 101 for supporting legacy network communication and 5G network communication according to various embodiments. FIG. 2B is a block diagram 200*b* of an electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246 and antennas 248. The electronic device 101 may further include a processor 120 and a memory 130. The network 199 may include a first cellular network 292 and a second cellular network 294. According to another embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to another embodiment, the fourth RFIC 228 may be omitted or may be included as a part of the third RFIC 226.

The first communication processor 212 may support establishment of a communication channel of a band to be used for wireless communication with the first cellular network 292, and legacy network communication through the established communication channel According to various embodiments, the first cellular network may be a legacy network including a second generation (2G), 3G, 4G, or long-term evolution (LTE) network. The second communication processor 214 may support establishment of a communication channel corresponding to a specified band (e.g., about 6 GHz to about 60 GHz) among bands to be used for wireless communication with the second cellular network 294, and 5G network communication through an established communication channel. According to various embodiments, the second cellular network 294 may be a 5G network defined by 3GPP. Additionally, according to an embodiment, the first communication processor 212 or the second communication processor 214 may support establishment of a communication channel corresponding to another specified band (e.g., about 6 GHz or less) among bands to be used for wireless communication with the second cellular network 294, and 5G network communication through an established communication channel The first communication processor 212 may transmit and receive data to and from the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART), (e.g., high speed-UART (HS-UART) or a peripheral component interconnect bus express (PCIe) interface), but there is no limitation in the type thereof. Alternatively, the first communication processor 212 and the second communication processor 214 may exchange control information and packet data information by using, for example, a shared memory. The first communication processor 212 may transmit and receive various information to and from the second communication processor 214, such as sensing information, information on output strength, and resource block (RB) allocation information.

Depending on the implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from the processor 120 (e.g., an application processor) through the HS-UART interface or the PCIe interface, but the type of interface is not limited. Alternatively, the first communication processor 212 and the second communication processor 214 may exchange control information and packet data information by using a shared memory with the processor 120 (e.g., an application processor).

According to an embodiment, the first communication processor 212 and the second communication processor 214 may be implemented in a single chip or a single package. According to various embodiments, the first communication processor 212 or the second communication processor 214 may be configured in a single chip or a single package with the processor 120, an auxiliary processor 123, or a communication module 190. For example, as illustrated in FIG. 2B, a unified communication processor 260 may support both functions for communication with the first cellular network and the second cellular network.

The first RFIC 222, on transmission, may convert the baseband signal generated by the first communication processor 212 into a radio frequency (RF) signal of about 700 MHz to about 3 GHz used in the first cellular network 292 (e.g., a legacy network). On reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

The second RFIC 224 may, on transmission, convert the baseband signal generated by the first communication processor 212 or the second communication processor 214 into an RF signal (hereinafter, 5G Sub6 RF signal) of the Sub6 band (e.g., about 6 GHz or less) used for the second cellular network 294 (e.g., a 5G network). On reception, a 5G Sub6 RF signal may be obtained from the second cellular network 294 (e.g., 5G network) through an antenna (e.g., second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second cellular network 294 (e.g., a 5G network). On reception, a 5G Above6 RF signal may be obtained from the second cellular network 294 (e.g., 5G network) through antennas (e.g., antennas 248), and may be preprocessed through a third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

According to an embodiment, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then transmit the IF signal to the third RFIC 226. The third RFIC 226 may convert the IF signal into a 5G Above6 RF signal. On reception, the 5G Above6 RF signal may be received from the second cellular network 294 (e.g., 5G network) through antennas (e.g., antennas 248) and converted to an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to various embodiments, when the first RFIC 222 and the second RFIC 224 in FIG. 2A or 2B are implemented as a single chip or a single package, the second RFIC 224 may be omitted. In this case, the first RFIC 222 may be connected to the first RFFE 232 and second RFFE 234 to convert a baseband signal into a signal of a band supported by the first RFFE 232 and/or second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module of the first antenna module 242 or the second antenna module 244 may be omitted or may be combined with another antenna module to process RF signals of a plurality of corresponding bands.

According to an embodiment, the third RFIC 226 and the antennas 248 may be disposed on the same substrate to configure the third antenna module 246. For example, the wireless communication module 192 or the processor 120 may be disposed on the first substrate (e.g., main PCB). In this case, the third RFIC 226 may be disposed in a partial area (e.g., bottom) of the second substrate (e.g., sub PCB) separate from the first substrate, and the antennas 248 may be disposed in another partial area (e.g., top), thereby configuring the third antenna module 246. By disposing the third RFIC 226 and the antennas 248 on the same substrate, it is possible to reduce the length of the transmission line therebetween. This, for example, may reduce loss (e.g., attenuation) of a signal in a high-frequency band (e.g., about 6 GHz to about 60 GHz) used for 5G network communication by the transmission line. Accordingly, the electronic device 101 may improve the quality or speed of communication with the second cellular network 294 (e.g., a 5G network).

According to an embodiment, the antennas 248 may be configured as an antenna array including a plurality of antenna elements that may be used for beamforming. In this case, the third RFIC 226 may include, for example, as part of the third RFFE 236, a plurality of phase shifters 238 corresponding to a plurality of antenna elements. On transmission, each of the plurality of phase shifters 238 may convert the phase of a 5G Above6 RF signal to be transmitted to the outside (e.g., a base station of a 5G network) of the electronic device 101 through a corresponding antenna element. On reception, each of the plurality of phase shifters 238 may convert the phase of the 5G Above6 RF signal received from the outside through a corresponding antenna element into the same or substantially the same phase. This enables transmission or reception through beamforming between the electronic device 101 and the outside.

The second cellular network 294 (e.g., 5G networks) may operate independently (e.g., Stand Alone (SA)) of the first cellular network 292 (e.g., legacy networks) or may be connected and operated (e.g., Non-Stand Alone (NSA)). For example, a 5G network may have only an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and may be accessed by other components (e.g., the processor 120, the first communication processor 212, or the second communication processor 214).

Figure 3:
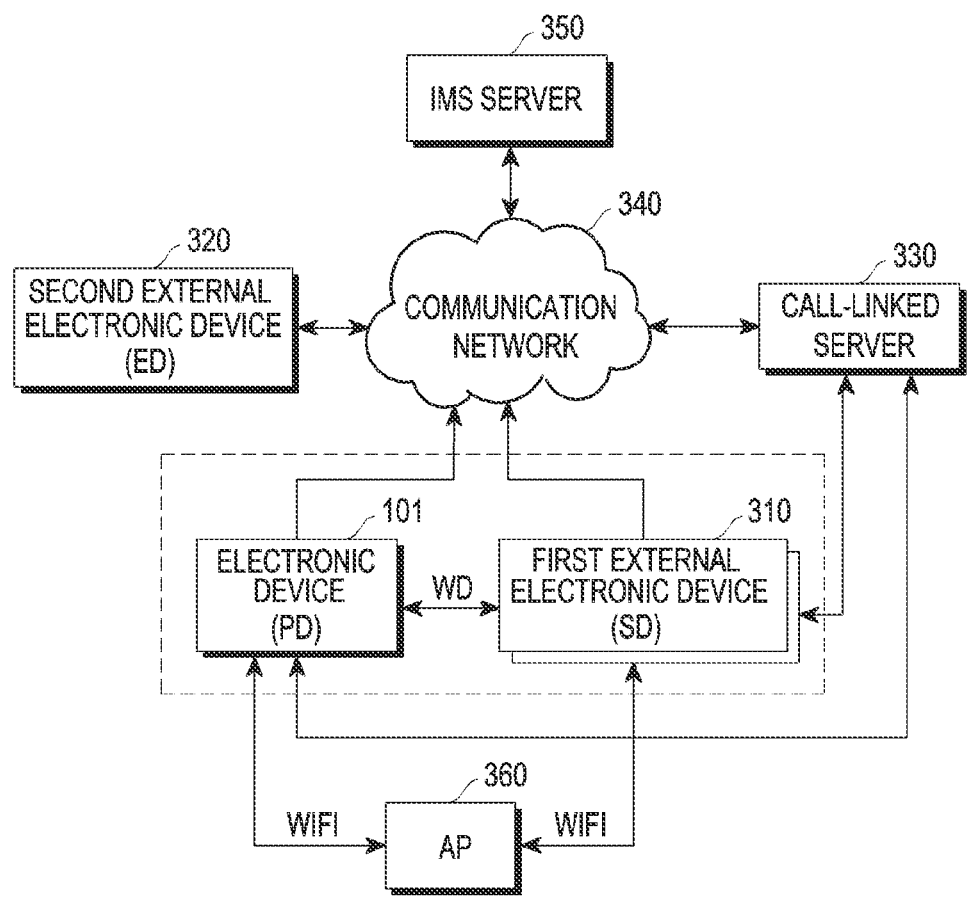
FIG. 3 illustrates a communication system including an IMS network according to various embodiments.

FIG. 3 illustrates a communication system including an IMS network according to various embodiments. Referring to FIG. 3, the system according to various embodiments may include at least one of an electronic device 101, at least one first external electronic device 310, a second external electronic device 320, a call-linked server (or a call and message continuity (CMC) server) 330, a communication network 340, an IP multimedia subsystem (IMS) server 350, or an access point (AP) 360.

According to various embodiments, the electronic device 101 may register to the IMS server 350 through the communication network 340 to receive an IMS service (e.g., a voice over LTE (VoLTE) service or a voice over NR (VoNR) service). The electronic device 101 may make a high-quality call (e.g., a voice call, a video call) based on the IMS service with the second external electronic device 320 through the IMS server 350. The communication network 340 may include a cellular communication network, and may be a legacy network including a second generation (2G), 3G, 4G, or long term evolution (LTE) network. The communication network 340 may be a 5G network defined by 3GPP.

According to various embodiments, a user of the electronic device 101 may use a plurality of electronic devices (e.g., a smartphone, a smartwatch, or a tablet) in conjunction with each other. For example, the user of the electronic device 101 may use the electronic device 101 and at least one first external electronic device 310 in conjunction with each other. According to various embodiments, the electronic device 101 may be an electronic device that may be registered to the IMS server 350 by being subscribed to the IMS service, and the at least one first external electronic device 310 may be an electronic device that cannot be registered to the IMS server 350 by not being subscribed to the IMS service. The user may receive the IMS service through the first external electronic device 310 by linking the electronic device 101 with the first external electronic device 310.

According to various embodiments, the user may register the electronic device 101 and at least one first external electronic device 310 with the call-linked server 330 through the communication network 340. The electronic device 101 and the at least one first external electronic device 310 may be registered with the call-linked server 330 with the same user account, and each device may be identified by a device ID. According to various embodiments, the call-linked server 330 may integrate and manage call services of the electronic device 101 and at least one first external electronic device 310. For example, when an IMS call is received from the second external electronic device 320 to the electronic device 101, the electronic device 101 may request call forking by transmitting the IMS call received from the call-linked client object (e.g., a CMC object) of the electronic device 101 to the call-linked server 330. The call-linked server 330 may receive the call forking request from the electronic device 101 and perform call relay to at least one first external electronic device 310 registered with the same account as the electronic device 101. According to the call relay of the call-linked server 330, the at least one external electronic device 310 may receive an IMS call. From the perspective of the call connection service, the electronic device 101 may be referred to as a primary device (PD), and the at least one first external electronic device 310 may be referred to as a secondary device (SD). The second external electronic device 320 that transmits and receives an IMS call through the electronic device 101 and the IMS server 350 may be referred to as an external device (ED). According to various embodiments, the call-linked server 330 may be referred to as a call and message continuity (CMC) server. For example, the call-linked server 330 may include a plurality of servers (e.g., an entitlement server, an NMS server, and a TAS) according to its function. The call-linked server 330 (e.g., the entitlement server) may perform a function of subscribing to a CMC service for the electronic device 101 or at least one first external electronic device 310 and managing a service group. According to various embodiments, when the at least one first external electronic device 310 makes a call to the second external electronic device 320, the outgoing call may be delivered to the electronic device 101 which is the PD of the same account as the first external electronic device 310 through the call-linked server 330. The electronic device 101 may request a call from the second external electronic device 320 through the IMS server 350, based on a call request signal from the first external electronic device 310 received from the call-linked server 330.

According to various embodiments, when located in an area where the call-linked server 330 is not provided or call forking is not provided through the call-linked server 330, the electronic device 101 may provide an IMS service to the first external electronic device 310 by connecting with the at least one first external electronic device 310 with a device to device (D2D) (or peer to peer (P2P)) method. For example, the electronic device 101 may include at least some server functions of the call-linked server 330 in the electronic device 101 and generate a transport layer security (TLS) server corresponding to the IMS server in the electronic device 101 so as to function as an IMS server for the first external electronic device 310. The first external electronic device 310 may generate a TLS client corresponding to an IMS client in the first external electronic device 310 so as to function as an IMS client for the electronic device 101. By the IMS server function generated in the electronic device 101 and the IMS client function generated in the first external electronic device 310, the electronic device 101 and the first external electronic device 310 may communicate through an IMS protocol. For example, the electronic device 101 may provide a call forking function for the first external electronic device 310 provided by the call-linked server 330 through the IMS server function. The electronic device 101 and the first external electronic device 310 may directly transmit and receive a real-time transport protocol (RTP) packet for a call through a D2D (or P2P) connection. A detailed description thereof will be described later in the description of FIG. 5.

According to various embodiments, as the electronic device 101 and the at least one first external electronic device 310 communicate directly through a short-range communication means and the electronic device 101 operates as an IMS server for the at least one first external electronic device 310, the IMS service may be provided to the first external electronic device 310 without the call-linked server 330. According to various embodiments, the call-linked server 330 may operate only as an entitlement server to manage accounts for the electronic device 101 and the at least one first external electronic device 310. For example, the electronic device 101 and at least one first external electronic device 310 may be registered with the entitlement server of the call-linked server 330 with the same account. According to various embodiments, the electronic device 101 may be D2D connected to provide an IMS service to the at least one first external electronic device 310, and in the D2D connection process, may receive at least one piece of identification information (e.g., a line ID) from the call-linked server 330 to determine whether the account is the same. A detailed description thereof will be described in the description of FIGS. 9 to 15.

According to various embodiments, the electronic device 101 and at least one first external electronic device 310 may be connected through D2D (or P2P) by a short-range communication method. For example, the short-range communication method may include at least one of Wi-Fi, Wi-Fi direct (WD), mobile hotspot, Bluetooth (BT), or Bluetooth Low Energy (BLE). For example, when the electronic device 101 and at least one first external electronic device 310 are connected through Wi-Fi, they may be connected to each other through the access point (AP) 360. According to various embodiments, when the at least one first external electronic device 310 does not exist in the network of the AP 360 to which the electronic device 310 belongs, the electronic device 101 may directly connect with the first external electronic device 310 (e.g., direct connection through Wi-Fi direct) by broadcasting advertisement packet data. Various embodiments of a D2D (or P2P) connection method between the electronic device 101 and at least one first external electronic device 310 will be described in detail with reference to FIGS. 6 to 14.

Figure 4A:
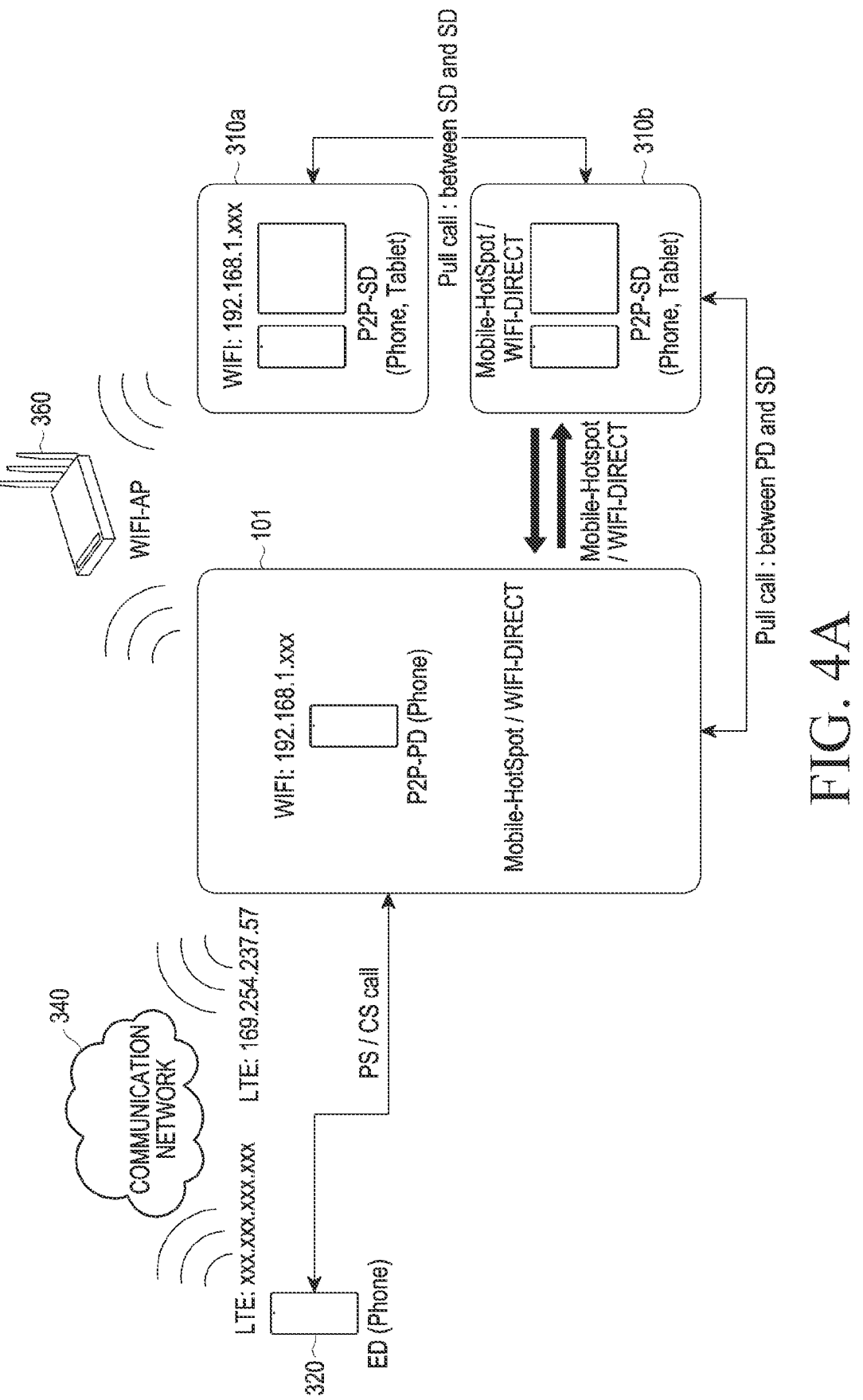
FIG. 4A is a block diagram of an electronic device in a network environment according to various embodiments.

FIG. 4A is a block diagram of an electronic device in a network environment according to various embodiments. Referring to FIG. 4A, the electronic device 101 (PD) may transmit and receive a packet switched (PS) call or a circuit switched (CS) call with the second external electronic device 320 (ED) through the communication network 340. Assuming that the communication network 340 is an LTE network, when making a PS call with the second external electronic device 320, the electronic device 101 may be assigned an IP address of, for example, 169.254.237.57.

According to various embodiments, the electronic device 101 may be connected with a plurality of first external electronic devices 310 (e.g., 1-1 external electronic device 310a, 1-2 external electronic device 310b) in a D2D (or P2P) method by means of short-range communication. As described above, the electronic device 101 may be connected with the plurality of first external electronic devices 310 in a Wi-Fi method through the AP 360, or may be directly connected without going through the AP 360. For example, the electronic device 101 may be directly connected with the plurality of first external electronic devices 310 through at least one of a mobile hotspot, Wi-Fi direct, and Bluetooth without going through the AP 360. Referring to FIG. 4A, when a user connects and uses a plurality of electronic devices, the electronic device 101 and the 1-1 external electronic device 310a may be connected with a Wi-Fi method, and simultaneously, the 1-2 external electronic device 310b may be connected in a mobile hotspot or Wi-Fi direct (WD) method. According to various embodiments, when the 1-1 external electronic device 310a cannot be connected with the AP 360, it may be connected with the electronic device 101 with a mobile hotspot or Wi-Fi direct (WD) method.

According to various embodiments, the electronic device 101 may be registered to the IMS server 350 so that an IMS call with the second external electronic device 320 may be transmitted/received, or may be in a state in which a CS call is possible. The electronic device 101 may generate a TLS server corresponding to the IMS server in the electronic device 101 as described above so as to receive a connection request from at least one first external electronic device 310 capable of a D2D connection. The electronic device 101 may generate a path for communication from an IMS framework layer to a RESIP layer in order to generate the TLS server in the electronic device 101. According to various embodiments, a part of the RESIP layer may include, for example, a part of a Session Initiation Protocol (SIP) protocol stack developed as an open source. The electronic device 101 may perform an internal D2D registration procedure to generate a path for communication from the IMS framework layer to the RESIP layer. The internal D2D registration process may include generating a TLS server within the RESIP layer in the electronic device 101 without transmitting a REGISTER SIP over the network according to the IMS registration request. As the internal D2D registration procedure is completed, the electronic device 101 may be in a state capable of accepting a device registration request from at least one first external electronic device 310. A detailed description thereof will be described later in the description of FIG. 5.

According to various embodiments, the electronic device 101 or the first external electronic device 310 may include a network service discovery (NSD) module to support D2D connection between each other. In the following description, the network service discovery module will be referred to as NSD, and the following embodiments are not limited to the term. According to various embodiments, the NSD may determine whether the electronic device 101 and the first external electronic device 310 exist within the area of the same AP 360 or the area of different APs. The NSD may identify whether the Wi-Fi module state of the electronic device 101 or the first external electronic device 310 is on or off and notify other modules. The NSD may be included in the electronic device 101 or may be included in the first external electronic device 310. For example, the NSD included in the electronic device 101 may play a role of generating a WIFI direct group owner (GO) to generate a WIFI access point (AP) that the first external electronic device 310 may access. The NSD included in the electronic device 101 may provide GO channel information and port information for authentication so that the first external electronic device 310 may quickly perform a discovery operation during BLE advertising. The NSD included in the electronic device 101 may perform authentication on the first external electronic device 310 and may generate a token for the authentication process.

According to various embodiments, the NSD included in the first external electronic device 310 may play a role of establishing a WIFI direct connection by connecting the BLE packet received from the electronic device 101 to the GO. The NSD included in the first external electronic device 310 may perform a role of requesting authentication from the electronic device 101 when the connection with the BLE packet is established. According to various embodiments, the electronic device 101 or the first external electronic device 310 may perform fast discovery by using the NSD, and the electronic device 101 may include port information for authentication (e.g., "AuthPort") in the BLE packet to be transmitted.

According to various embodiments, the electronic device 101 may determine whether to register D2D through information (observer) notified by the NSD, and a detailed description thereof will be described later in the description of FIGS. 15 to 20.

According to various embodiments, a pull call function during a call may be provided between the electronic device 101 and the 1-2 electronic device 310b. For example, while the electronic device 101 is communicating with the second external electronic device 320, the 1-2 external electronic device 310b may pull a call from the electronic device 101 by the pull call function. According to various embodiments, the pull call function during a call may be provided between the 1-1 external electronic device 310a and the 1-2 external electronic device 310b. For example, while the first external electronic device 310a is communicating with the second external electronic device 320, the 1-2 external electronic device 310b may pull a call from the 1-1 external electronic device 310a by the full call function.

Figure 4B:
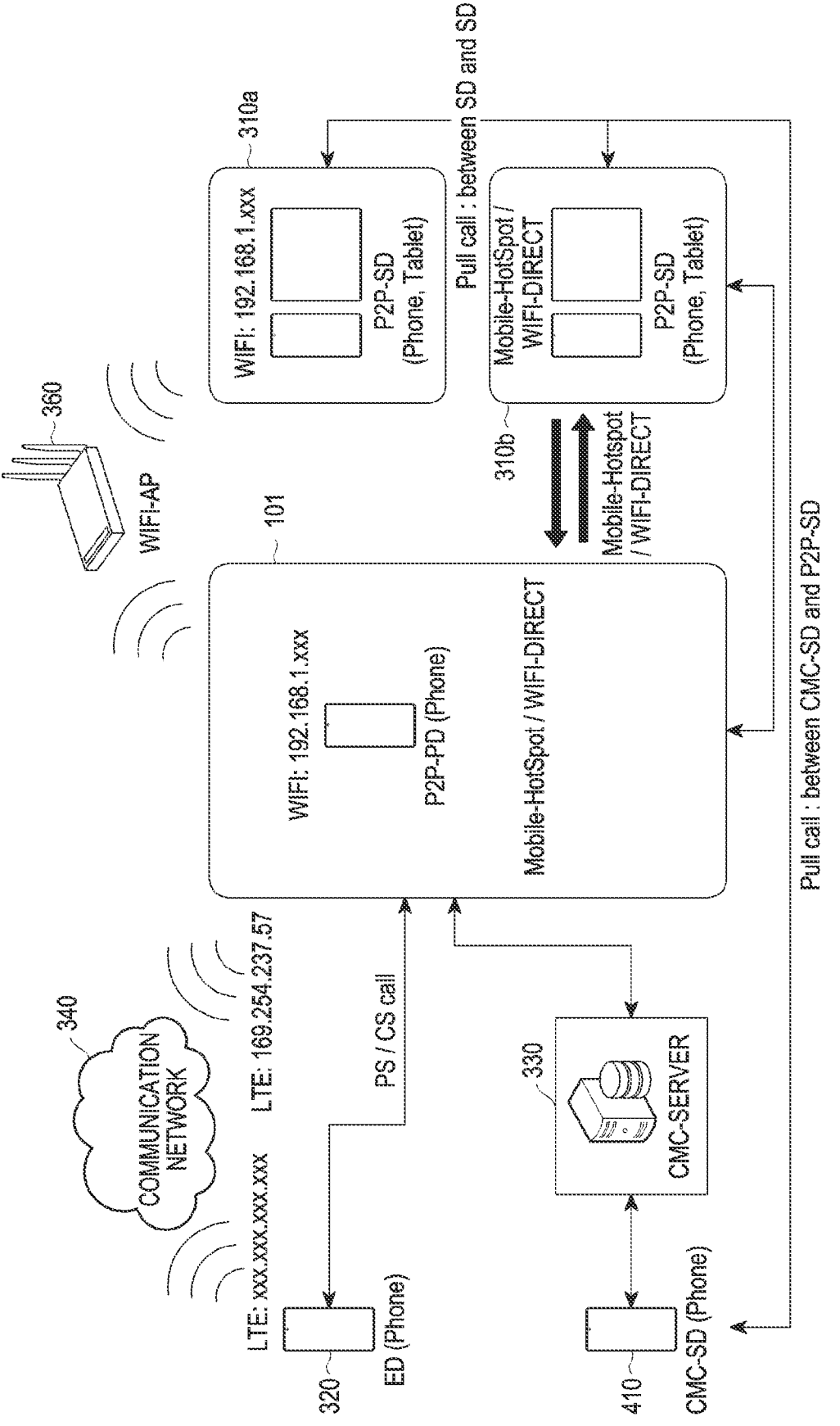
FIG. 4B is a block diagram of an electronic device in a network environment according to various embodiments.

FIG. 4B is a block diagram of an electronic device in a network environment according to various embodiments. Referring to FIG. 4B, the electronic device 101 may provide the IMS service through a D2D (or P2P) connection with the 1-1 external electronic device 310a or the 1-2 external electronic device 310b. According to various embodiments, the electronic device 101 may provide the IMS service to a 1-3 external electronic device 410 through the call-linked server 330. The call-linked server 330 may relay a call received from the electronic device 101 to the 1-3 external electronic device 410 according to the call forking request received from the electronic device 101.

According to various embodiments, a pull call function during a call may be provided between the 1-1 external electronic device 310a or 1-2 external electronic device 310b and the 1-3 external electronic device 410. For example, while the first external electronic device 310a is communicating with the second external electronic device 320, the 1-3 external electronic device 410 may pull a call from the 1-1 external electronic device 310a through the pull call function.

Figure 5:
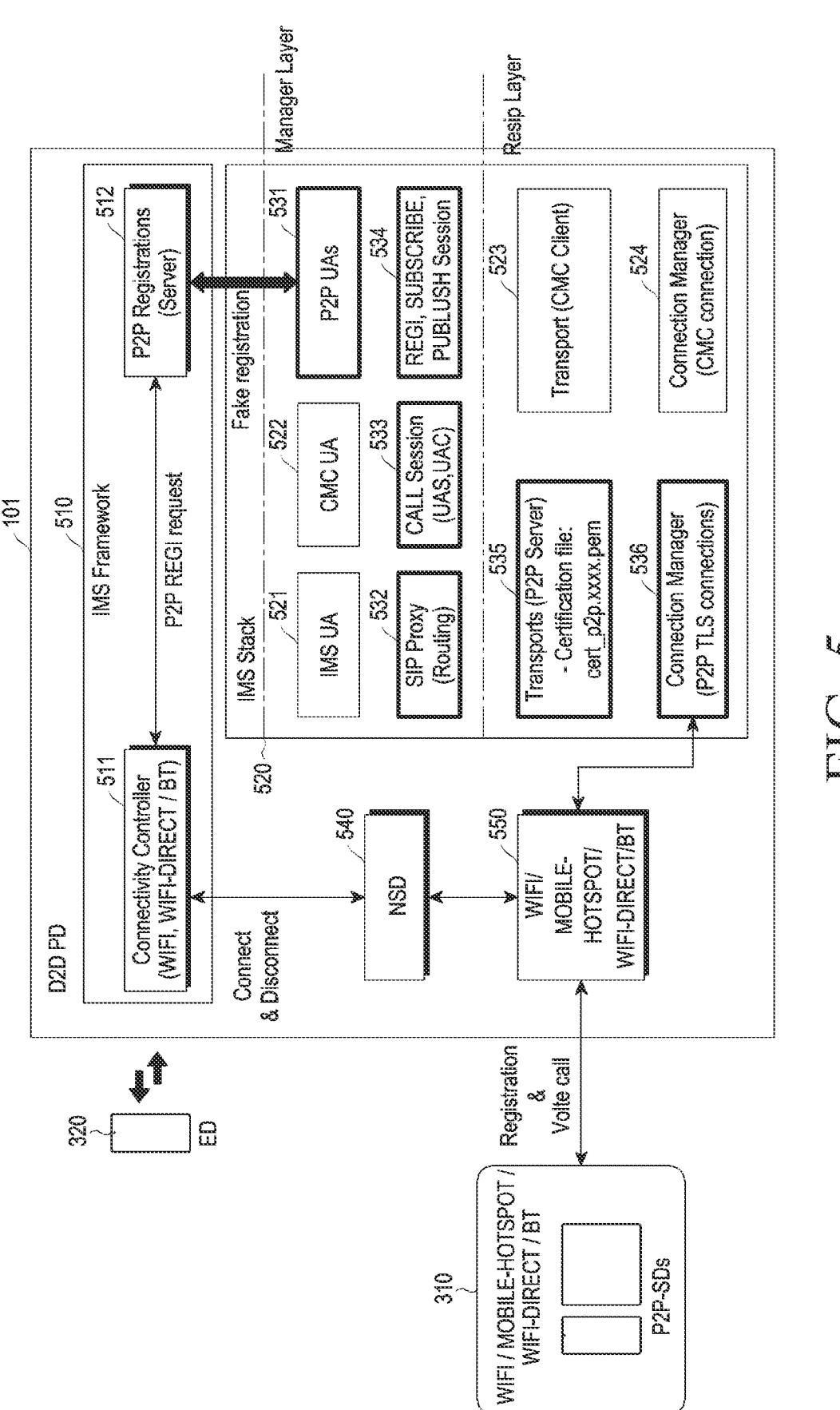
FIG. 5 is a block diagram of an electronic device according to various embodiments.

FIG. 5 is a block diagram of an electronic device according to various embodiments. Referring to FIG. 5, the electronic device 101 may include an IMS framework 510, an IMS stack 520, an NSD 540, and a short-range communication module 550. The IMS framework 510 may include a connectivity controller object 511 and a P2P registration object 512. The IMS stack 520 may include a manager layer (or core layer) and a RESIP layer.

According to various embodiments, the manager layer may include an IMS user agent (UA) object 521 and a CMC UA object 522 for interworking with the call-linked server 330, one or more P2P UA objects 531 for operating as a call IMS server, a SIP proxy manager 532, a call session manager 533, and a registration session manager 534.

According to various embodiments, the RESIP layer may include a TLS client object 523 (e.g., a CMC client) and a first connection manager 524 (e.g., a CMC connection manager) for interworking with the call-linked server 330, and include a TLS server object 535 (e.g., a P2P server) for operating as an IMS server and a second connection manager 536 (e.g., a P2P TLS connection manager).

According to various embodiments, the electronic device 101 may require the TLS server object 535 operating as a server type to accept a TLS connection request (or device registration request) from at least one first external electronic device 310. To this end, virtual IMS registration between the connectivity controller object 511 of the IMS framework 510 and the IMS stack 520 is required, and the TLS server object 535 may be generated in the RESIP layer through the virtual IMS registration procedure.

According to various embodiments, the connectivity controller object 511 is an object in charge of P2P registration, and determines whether to perform D2D registration through interface information (e.g., WIFI/Mobile hotspot/Wi-Fi direct (WD)/Bluetooth) received from the NSD 540. The connectivity controller object 511 may control different D2D registration states by considering the priority of each interface.

According to various embodiments, the P2P UA object 531 may be generated during the IMS registration procedure and may include a profile and D2D-related information received from the IMS framework 510. The electronic device 101 may generate the TLS server object 535 in the RESIP layer, based on information included in the P2P UA object 531, and the first external electronic device 310 may generate a TLS client object. The P2P UA object 531 may provide D2D-related information to the SIP proxy manager 532, and the SIP proxy manager 532 may perform accurate SIP routing, based on the D2D-related information received from the P2P UA object 531.

According to various embodiments, the SIP proxy manager 532 may process routing of SIP protocol signals generated in the electronic device 101. The SIP proxy manager 532 may generate new SIPs necessary for a D2D operation as needed, and perform a role in exchanging the SIPs with the corresponding first external electronic device 310. The SIP proxy manager 532 may identify the CMC type received from each of the UA objects 521, 522, and 531 or the call session manager 533, and determine operations to be performed according to the corresponding CMC type. For example, the operations involved by the SIP proxy manager 532 may include a registration procedure, a call procedure, or a subscription procedure.

According to various embodiments, the TLS server object 535 may generate an IMS server object to accept TLS connections. For example, when a connection request is detected from the first external electronic device 310, the TLS server object 535 may perform a handshake through a secure socket layer (SSL) for an authentication procedure, and generate a client connection object to process the corresponding connection. The generated client connection object may be managed by the second connection manager 536. The TLS server object 535 may generate a PEM file including a domain-type certification and a private key for an authentication procedure. Information generated or managed by the TLS server object 535 may be delivered to the corresponding first external electronic device 310 during an authentication procedure with the first external electronic device 310. The delivery may be delivered in a streaming form, but is not limited thereto.

According to various embodiments, the second connection manager 536 may add newly generated P2P client access information, and IP and port information of the corresponding connection may be added to a new map and stored during the above process. For example, as the electronic device 101 also operates as an IMS server, access information may be additionally stored to provide accurate SIP communication (e.g., destination routing) between a server and a client. For example, the TLS server object 535 of the electronic device 101 may transmit SIP to a client connection through the second connection manager 536.

Figure 6:
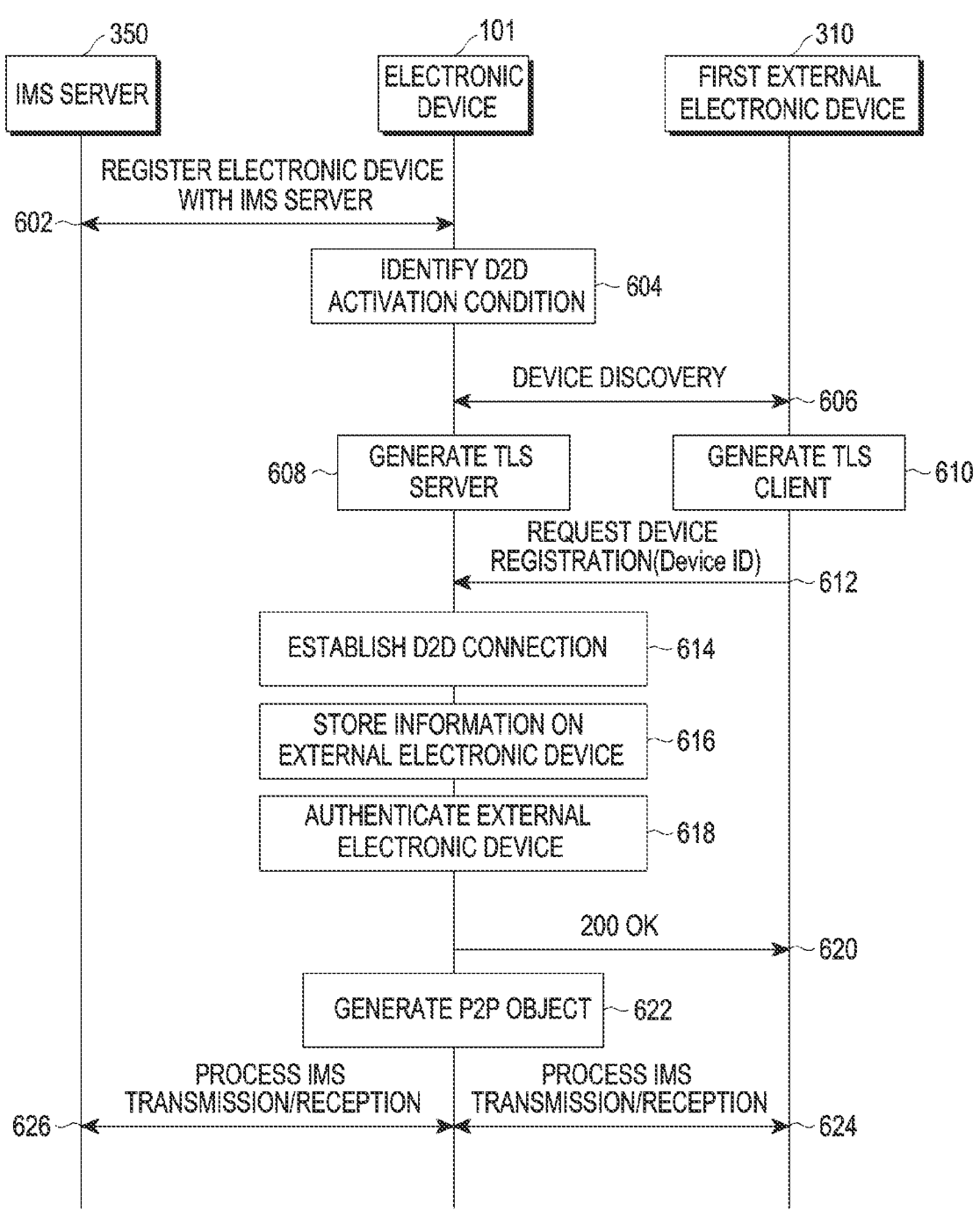
FIG. 6 is a flowchart illustrating an operation of an electronic device according to various embodiments.

FIG. 6 is a flowchart illustrating an operation of an electronic device according to various embodiments. Referring to FIG. 6, in operation 602, the electronic device 101 may register to the IMS server 350 to receive an IMS service (e.g., VoLTE or VoNR service). According to various embodiments, in operation 604, the electronic device 101 may identify a D2D activation condition.

According to various embodiments, as described above in the description of FIG. 3, the call forking function may be supported through the call-linked server 330. As a user moves to an area or a country where the call-linked server 330 does not exist, the electronic device 101 may provide the IMS service through D2D connection without the call-linked server 330.

According to various embodiments, the conditions in which the D2D service may be activated in the electronic device 101 may include the following conditions. For example, when the electronic device 101 does not provide the D2D service, because the first external electronic device 310 cannot use the D2D service either, the electronic device 101 may first identify the conditions for providing the D2D service. For example, the D2D service may be activated with a basic configuration (e.g., with a default configuration) for electronic devices 101 produced for specific countries or operators that cannot provide a call forking service (e.g., a CMC service) through the call-linked server 330. According to various embodiments, whether the CMC service is activated may be determined by identifying the unique product number of the electronic device 101 or operator information (e.g., operation and maintenance center (OMC) information).

According to various embodiments, the D2D service may be activated for a SIM card manufactured for a specific country where the CMC service is not available. For example, the D2D service may be activated with unique MCC/MNC information stored in the SIM card. The electronic device 101 may read information stored in the SIM card to determine whether the SIM card belongs to a country or the operator capable of supporting the D2D service.

According to various embodiments, the D2D service may be activated when connected to an operator network in a specific country where the CMC service is not available. When connected to the operator network, activation may be determined by identifying a network public land mobile network (PLMN) received from the CP.

Figure 8:
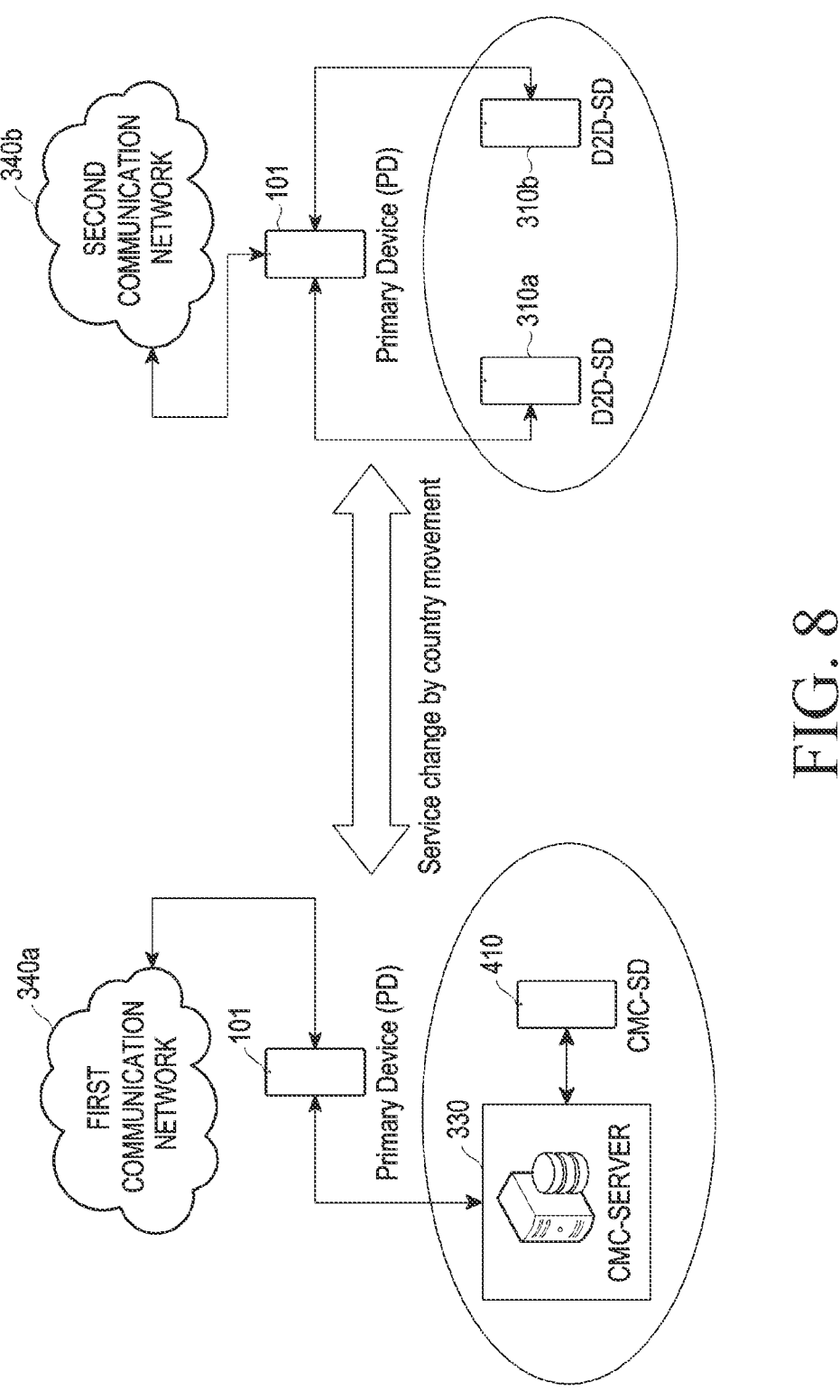
FIG. 8 is a diagram illustrating an example of switching an IMS call service method according to switching of a communication network according to various embodiments.

FIG. 8 is a diagram illustrating an example of switching an IMS call service method according to switching of a communication network according to various embodiments. Referring to FIG. 8, a user may possess the electronic device 101 and use an CMC service with the 1-3 external electronic device 410 through the call-linked server 330 in the first communication network 340*a* of country A. The user may move from country A to country B and connect to the second communication network 340*b* of country B. Because there is no call-linked server 330 in the second communication network 340*b*, the CMC service cannot be provided, so the CMC service may become de-activation and the D2D service may be activated. As the D2D service is activated, the electronic device 101 may provide call forking by D2D (or P2P) connection with the 1-1 external electronic device 310*a* or the 1-2 external electronic device 310*b* through a short-range communication method. For example, the short-range communication method may include at least one of Wi-Fi, Wi-Fi direct (WD), mobile hotspot, Bluetooth (BT), or Bluetooth Low Energy (BLE).

According to various embodiments, when the electronic device 101 activates the D2D service as described in the above examples, the electronic device 101 may perform a device discovery procedure with at least one first external electronic device 310 in operation 606. The device discovery procedure may be implemented in various ways according to the short-range communication method, and detailed examples thereof will be described later with reference to FIGS. 9 to 14.

According to various embodiments, when the electronic device 101 is connected with the first external electronic device 310 through the discovery process, the electronic device 101 may generate the TLS server object 535 functioning as an IMS server in operation 608. Correspondingly, the first external electronic device 310 may generate a TLS client object corresponding to the TLS server object 535 in operation 610. When the TLS server object 535 is generated in the electronic device 101, a device registration may be received from the first external electronic device 310. For example, the first external electronic device 310 may request the device registration from the electronic device 101 through the TLS client object in operation 612. The device registration request may include a device ID capable of identifying the first external electronic device 310. Upon receiving the device registration request, the electronic device 101 may establish a D2D connection in operation 614. The electronic device 101 may store information of the first external electronic device in operation 616 and authenticate the first external electronic device in operation 618. When the authentication is normally completed as a result of authentication of the external electronic device 101, the electronic device 101 may transmit an OK message (e.g., the SIP 200 OK message) to the first external electronic device 310 in operation 620. Operations 612 to 620 will be described in detail later in the description of FIG. 16. According to various embodiments, the electronic device 101 may generate a P2P object in operation 622 as the first external electronic device 310 is normally authenticated.

When the IMS registration procedure for the first external electronic device 310 is normally completed, the electronic device 101 may process an IMS outgoing/incoming call to the IMS server 350 by interworking with the first external electronic device 310 in operations 624 and 626.

Figure 7A:
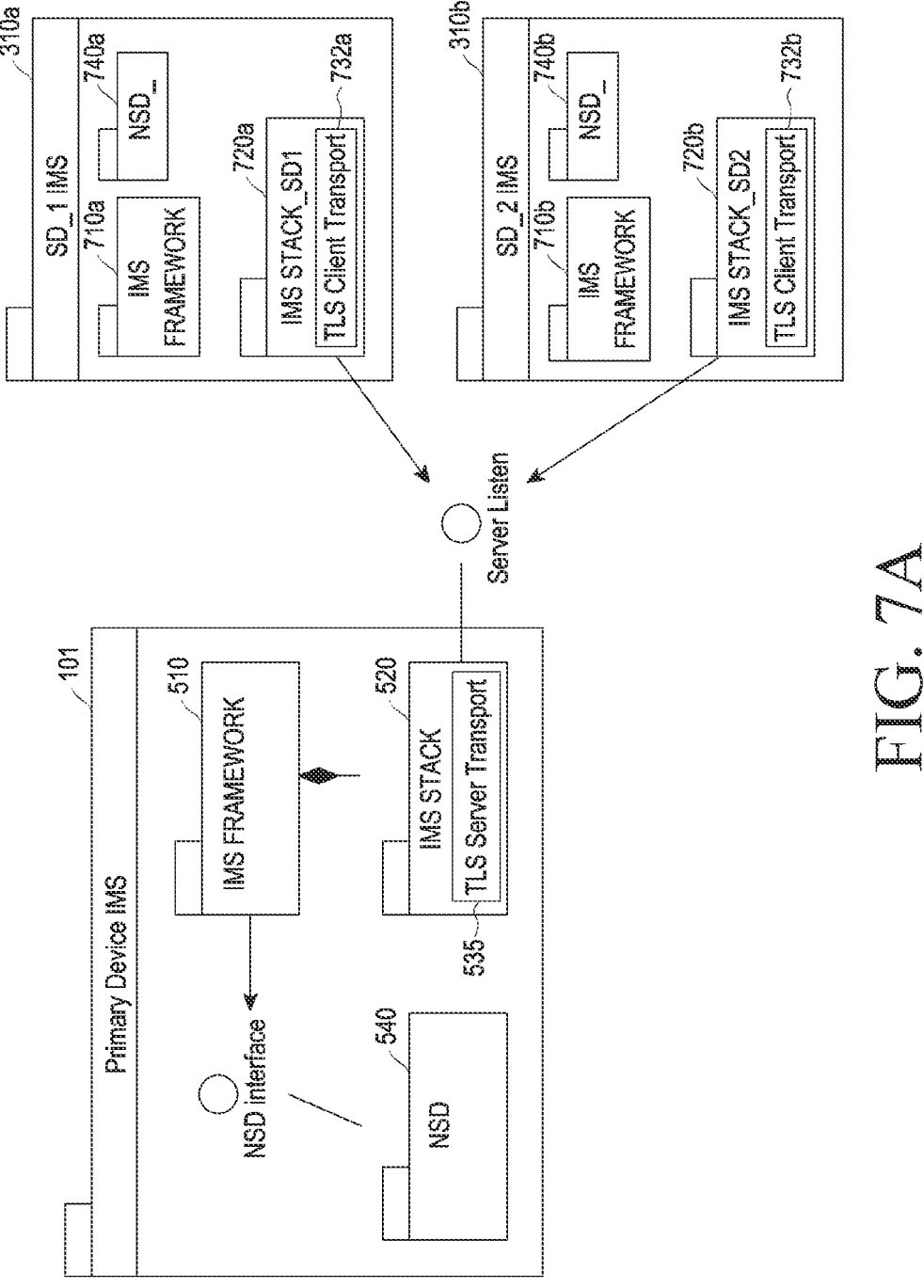
FIG. 7A is a diagram illustrating a connection between an electronic device and first external electronic devices according to various embodiments.

FIG. 7A is a diagram illustrating a connection between an electronic device and first external electronic devices according to various embodiments. Referring to FIG. 7A, the electronic device 101 (PD) may include the IMS framework 510, the IMS stack 520, and the NSD 540, and the IMS stack 520 includes the TLS server object 535. According to various embodiments, the 1-1 external electronic device 310*a* may include a first IMS framework 710*a*, a first IMS stack 720*a*, and a first NSD 740*a*. The 1-2 external electronic device 310*b* may include a second IMS framework 710*b*, a second IMS stack 720*b*, and a second NSD 740*b*.

For example, the NSD 540 included in the electronic device 101 may play a role of generating a WIFI direct group owner (GO) to generate a WIFI access point (AP) that the first external electronic devices 310*a* and 310*b* may access. The NSD 540 included in the electronic device 101 may provide GO channel information and port information for authentication so that the first external electronic devices 310*a* and 310*b* may quickly perform a discovery operation during BLE advertising. The NSD 540 included in the electronic device 101 may perform authentication on the first external electronic devices 310*a* and 310*b* and may generate a token for the authentication process.

According to various embodiments, NSDs 740*a* and 740*b* included in the first external electronic devices 310*a* and 310*b* may play a role of establishing a WIFI direct connection by connecting the BLE packet received from the electronic device 101 to the GO. The NSDs 740*a* and 740*b* included in the first external electronic devices 310*a* and 310*b* may perform a role of requesting authentication from the electronic device 101 when the connection with the BLE packet is established. According to various embodiments, the electronic device 101 or the first external electronic device 310 may perform fast discovery by using the NSD, and the electronic device 101 may include port information for authentication (e.g., "AuthPort") in the BLE packet to be transmitted.

According to various embodiments, the IMS framework 510 of the electronic device 101 may receive a report of a Wi-Fi state change from the NSD 540 and transmit a registration request to the IMS stack 520. The electronic device 101 may receive the registration request from the IMS framework 510, generate the TLS server object 535, and wait for a connection request from the first external electronic device 310*a*. According to various embodiments, the first external electronic device 310*a* may receive the report of a Wi-Fi state change from the NSD 740*a* and transmit a registration request to the electronic device 101 through the TLS client object 732*a* of the IMS stack 720*a*.

Figure 7B:
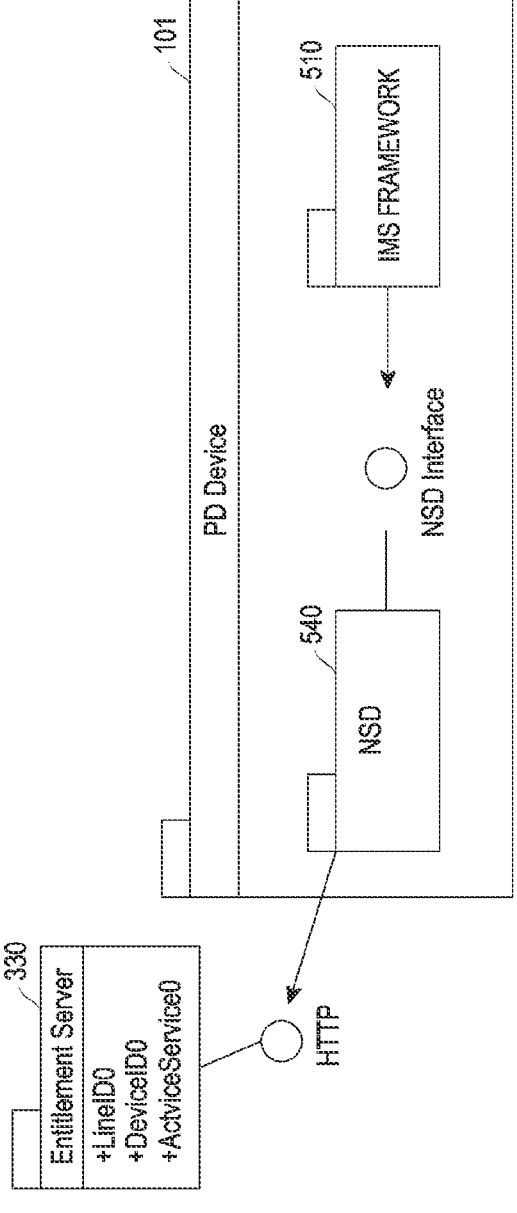
FIG. 7B is a diagram illustrating communication between an electronic device and a server device according to various embodiments.
Figure 7C:
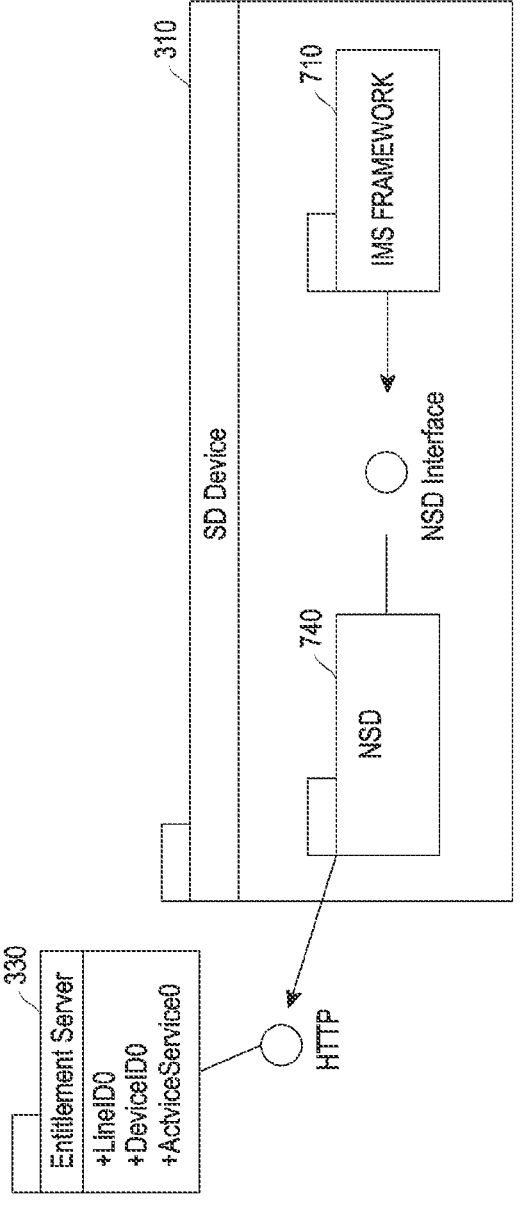
FIG. 7C is a diagram illustrating communication between a first external electronic device and a server device according to various embodiments.

FIG. 7B is a diagram illustrating communication between an electronic device and a server device according to various embodiments, and FIG. 7C is a diagram illustrating communication between a first external electronic device and a server device according to various embodiments. In order for the electronic device 101 to use the CMC service or the D2D service, an account corresponding to the related service may be required in the electronic device 101, and the D2D service may be provided to the electronic device 101 and the at least one first external electronic device 310 and 410 having the same account information. For example, referring to FIG. 7B, the electronic device 101 may receive a line ID (LineID), a device ID (DeviceID), and an active service (ActiveService) from the entitlement server of the call-linked server 330. The line ID may correspond to information identifying the call-linked server 330. The device ID may correspond to information identifying the electronic device 101. For example, referring to FIG. 7C, the first external electronic device 310 may receive a line ID (LineID), a device ID (DeviceID), and an active service (ActiveService) from the entitlement server of the call-linked server 330. The line ID may correspond to information identifying the call-linked server 330. The device ID may correspond to information identifying the first external electronic device 310. According to various embodiments, when the electronic device 101 does not provide the CMC service and provides only the D2D service, the call-linked server 330 may maintain only the entitlement server. According to various embodiments, the line ID and/or the device ID may be assigned to each user account and may correspond to each session. The active service information may include information (e.g., access token, whether the CMC is activated, server address, and whether the first external electronic device 310 is registered with the electronic device 101) provided from the call-linked server 330 to use the CMC function. Hereinafter, a search procedure between the electronic device 101 (PD) and the first external electronic device 310 (SD) according to various embodiments will be described with reference to FIGS. 9 to 14.

According to various embodiments, the NSDs 540 and 740 may provide connection and identification of a connection for providing P2P data communication between electronic devices. For example, the NSD may identify whether the electronic device 101 is in the same Wi-Fi network as the target first external electronic device 310. The NSD may identify whether the electronic device 101 is capable of the CMC service (e.g., call log/message/call forking) through P2P. The NSD may control the electronic device 101 to generate a Wi-Fi direct channel and provide a P2P data channel when there is no available data channel According to various embodiments, the NSD may simultaneously provide multiple interfaces as described above with reference to FIG. 4A or FIG. 4B. The NSD may provide a token for device-to-device authentication in the CMC service.

According to various embodiments, the NSD may configure different roles according to the electronic device 101 or the first external electronic device 310. For example, as a service provider, the electronic device 101 may accept/reject a request from the first external electronic device 310 after authenticating the request, or serve as a server providing a Wi-Fi direct (WD) channel as needed. The first external electronic device 310 may serve to request a token from the electronic device 101 or to request a P2P channel from the electronic device 101 when there is no P2P channel.

According to various embodiments, the NSD may perform a function of identifying whether the electronic device 101 and the first external electronic device 310 are in the same network when the electronic device 101 is connected to WIFI (including a mobile hotspot). For example, the NSD may determine whether the packet may be received through the same router by using a multicast packet, and the electronic device 101 and the first external electronic device 310 may authenticate through a secure channel. When the authentication is completed, each electronic device 101 may notify each service application, and each service application may attempt device-to-device communication suitable for the purpose.

According to various embodiments, when the electronic device 101 is not in the same network as the first external electronic device 310, the NSD may provide a function of establishing a connection to belong to the same network by performing a Wi-Fi direct connection. For example, when the electronic device 101 and the first external electronic device 310 are not connected to the same network and cannot communicate between the devices, a function similar to multicast packet data transmission may be performed through BLE to find nearby electronic devices.

According to various embodiments, each device may register to receive only BLE packets with the same line ID by using a BLE scan filter when NSD service starts, and devices (the electronic device 101 or the first external electronic device 310) need a connection may advertise BLE packets and broadcast them to the surroundings. Upon receiving the corresponding packets, the first external electronic device 310 may connect to the Wi-Fi direct group of the electronic device 101 by using the information included in the BLE packets, and authenticate through a secure channel after completing the connection. When the authentication is completed, each device may notify each service application.

Figure 9:
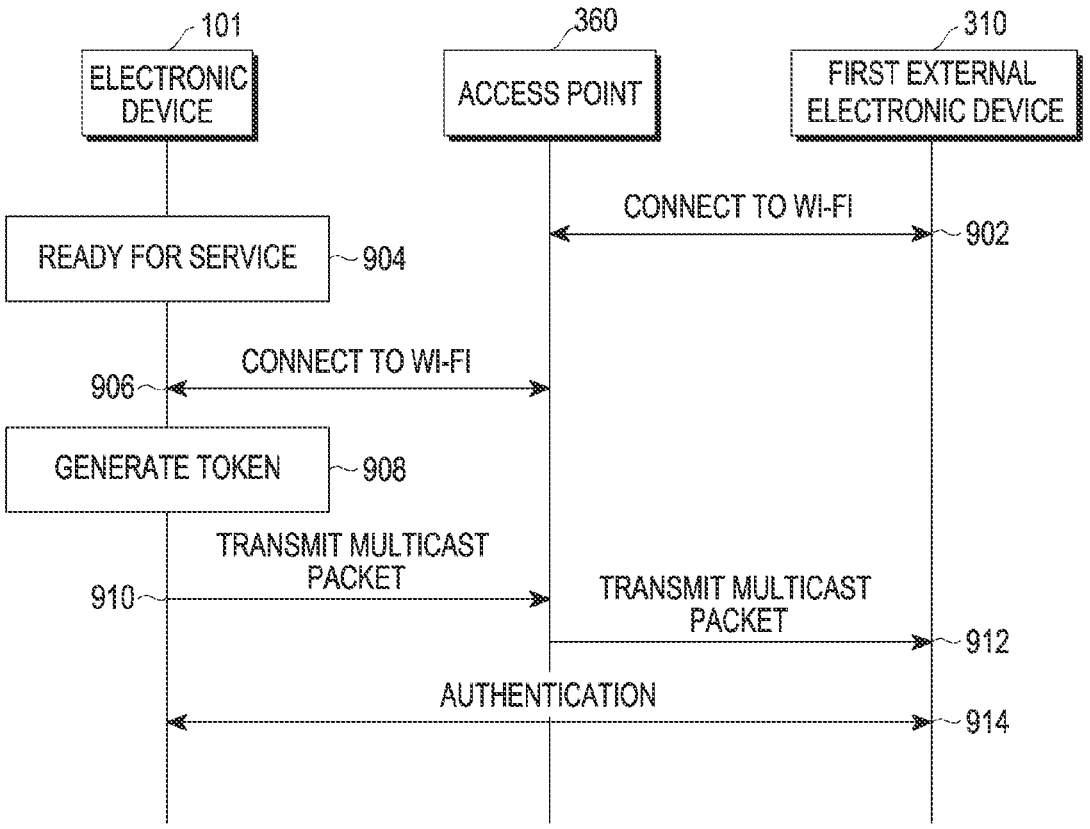
FIG. 9 is a flowchart illustrating operations between devices according to various embodiments.

FIG. 9 is a flowchart illustrating operations between devices according to various embodiments. Referring to FIG. 9, a CMC service or a D2D service may be searched by using a multicast packet. For example, as illustrated in FIG. 9, when the first external electronic device 310 is connected to the same Wi-Fi, the electronic device 101 may identify whether they are in the same network.

According to various embodiments, the first external electronic device 310 may be connected to Wi-Fi through the AP 360 in operation 902. Because the electronic device 101 is not connected with the AP 360 and is not ready for service, the electronic device 101 may not perform an additional operation. According to various embodiments, when the electronic device 101 is ready for service in operation 904 and connected to Wi-Fi through the AP 360 in operation 906, a token for P2P authentication may be generated in operation 908. The token may then be delivered to the first external electronic devices 310 through a secure channel in a discovery process, and then used for authentication when P2P services such as messages and call forking are provided. For example, the token may be composed of a 64-byte random string composed of uppercase/lowercase letters and numbers.

According to various embodiments, when token generation is completed in operation 908, the electronic device 101 may join a specific address group in order to transmit and receive a multicast packet by using a configured protocol (e.g., Internet group management protocol (IGMP)), and then transmits the multicast packet to the first external electronic device 310 through the AP 360 in operations 910 and 912. The electronic device 101 and the first external electronic device 310 may perform an authentication procedure in operation 914, and a detailed authentication operation will be described later with reference to FIG. 10. According to various embodiments, the address group used to transmit and receive the multicast packet may be, for example, 239.255.255.250:10004, and both the electronic device 101 and the plurality of first external electronic devices 310 may join a corresponding group to transmit and receive the packet. The multicast packet transmitted through the address group may include data as illustrated in Table 1 below.

TABLE 1

```
Multicast Packet {
    . Packet version
    . Packet role
    . Packet event
    . Line ID
    . Authentication port number
    . User message
}
```

Referring to Table 1, the line ID is a value provided from the call-linked server 330, and the same value may be obtained from the call-linked server 330 if the terminal uses the same user account. For example, because the electronic device 101 and the first external electronic device 310 already know their own line IDs, it is possible to specify whether a received multicast packet is a packet generated within the same line, and may ignore the packet if it is not a packet of the line ID known to the electronic device and the first external electronic device. For example, the line ID may be configured as in Equation 1 below. [Equation 1]

Line ID=HASH([device unique ID], SALT(user account))

Referring to Equation 1, the line ID may be configured as a hash value, based on a device unique ID and a user account. In Table 1, the authentication port number may be a server port number for authentication of the electronic device 101. The authentication port of the electronic device 101 may be changed whenever the NSD service starts, and whenever the authentication port is changed, a multicast packet may be transmitted to inform the first external electronic devices 310. According to various embodiments, when the first external electronic device 310 joining the IP group receives the multicast packet, the IP of the electronic device 101 may be obtained from the corresponding socket. The first external electronic device 310 may verify whether the packet generated from the same line ID is correct.

Figure 10:
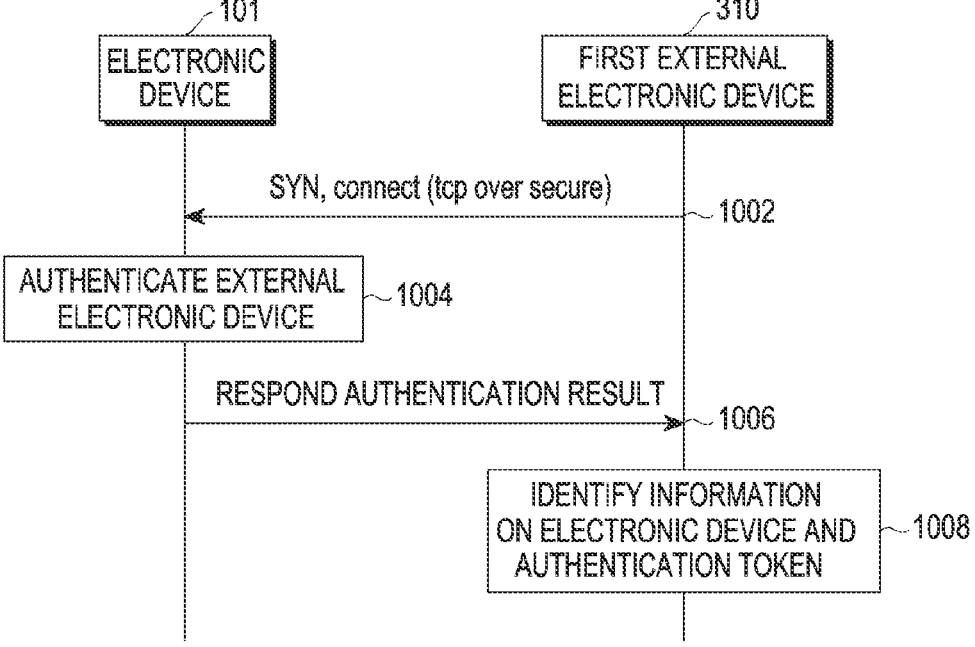
FIG. 10 is a flowchart illustrating operations between devices according to various embodiments.

FIG. 10 is a flowchart illustrating operations between devices according to various embodiments. According to various embodiments, if the packet has the same line ID, establishing an SSL connection with the "IP: authentication port number" of the electronic device 101 and exchanging necessary data including a device ID and an authentication token between the electronic device 101 and the first external electronic device 310 through a user handshake may be possible. The user handshake may be performed as illustrated in FIG. 10. For example, in operation 1002, the first external electronic device 310 may transmit its known line ID and its own device ID to the electronic device 101, and in operation 1004, the electronic device 101 may identify whether the line ID and device ID transmitted from the first external electronic device 310 are registered with the call-linked server 330 (e.g., CMC server).

As a result of the identification, if the first external electronic device 310 is normally registered with the call-linked server 330, the token generated in the previous process may be transmitted to the first external electronic device 310 as an authentication result in operation 1006. Due to the user handshake, the electronic device 101 and the first external electronic device 310 have the same token, and when a P2P service is performed thereafter, authentication may be confirmed by identifying whether the token matches.

According to various embodiments, when the authentication is normally completed, the first external electronic device 310 may identify the IP address and/or authentication token of the electronic device 101 through the multicast file received in operation 1008. When the authentication is passed, the first external electronic device 310 may transmit the identified information to each service application to notify that the electronic device 101 has been found in the same network.

Figure 11:
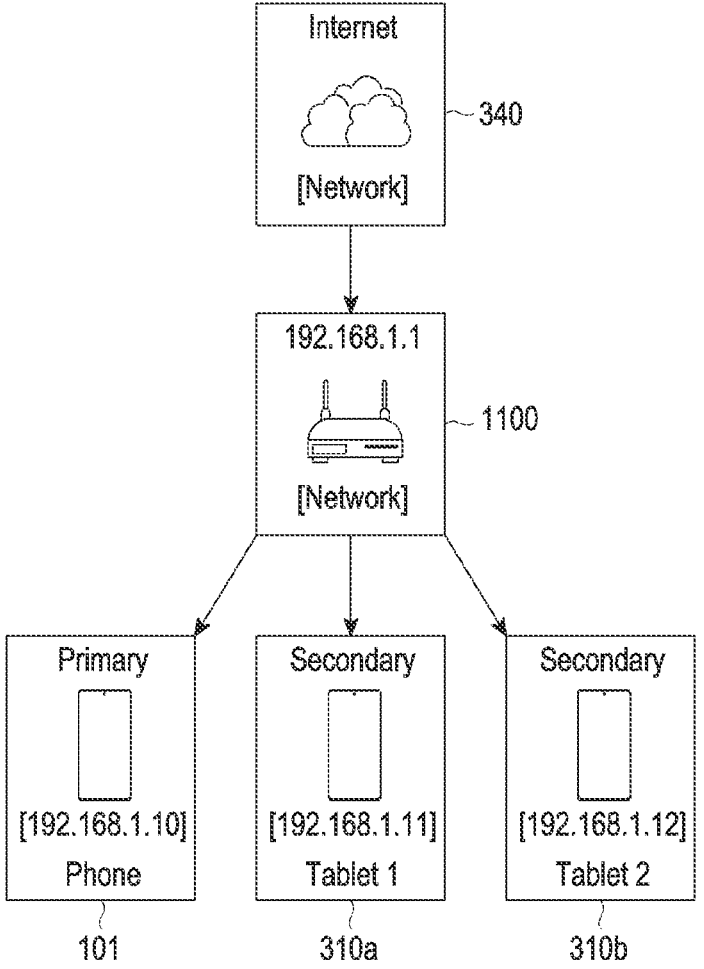
FIGS. 11 and 12 are diagrams illustrating connection relationships between devices according to various embodiments.
Figure 12:
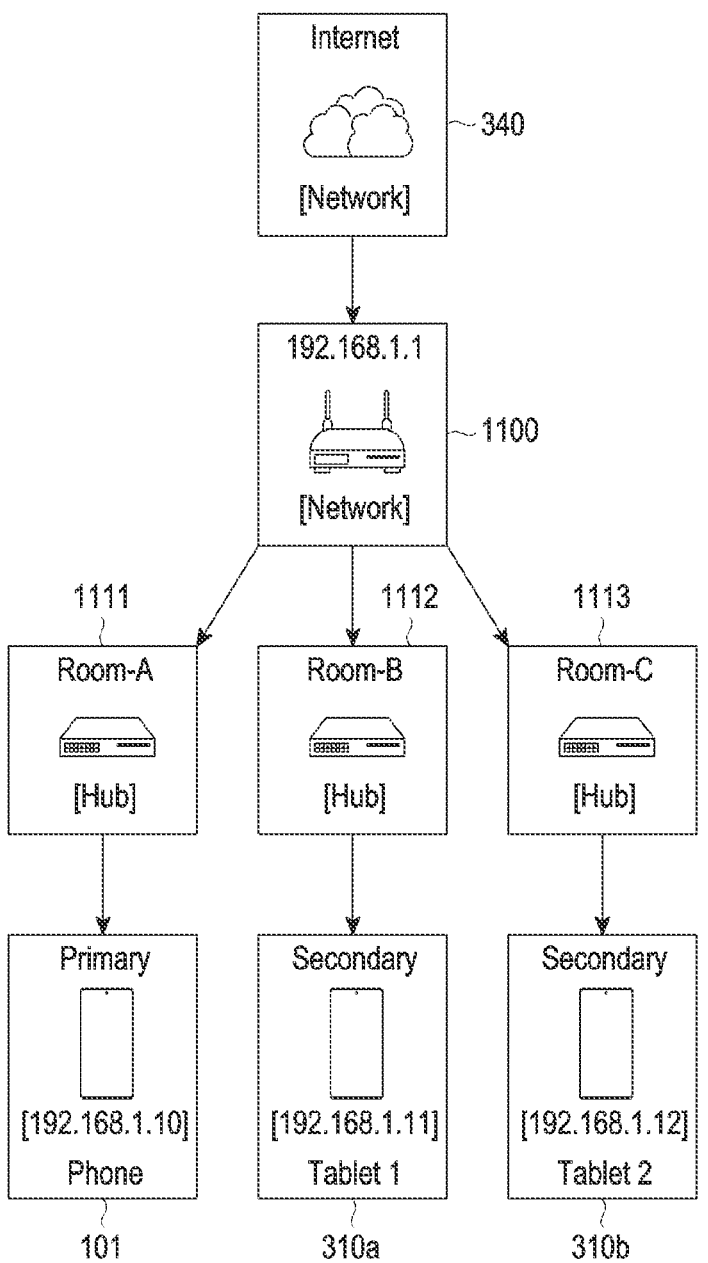

FIGS. 11 and 12 are diagrams illustrating connection relationships between devices according to various embodiments. According to various embodiments, in the case of the network configuration illustrated in FIG. 11 or FIG. 12, a service search may be performed through multicast packet transmission. For example, as illustrated in FIG. 11, when one electronic device 101 and two first external electronic devices 310a and 310b are connected with one AP 1100 connected to the communication network 340 (e.g., Internet), each first external electronic device 310a and 310b may be searched for and used in the network system. As illustrated in FIG. 12, when a plurality of expansion hubs 1111, 1112, and 1113 are connected with one AP 1100, and one electronic device 101 and two first external electronic devices 310a and 310b are connected with each of the expansion hubs 1111, 1112, and 1113, each first external electronic device 310a and 310b may be searched for and used in the network system. According to various embodiments, each first external electronic device 310a and 310b may be searched for and used in the network system even in a network system composed of one router.

Hereinafter, a Wi-Fi direct search method through BLE will be described. According to various embodiments, when the NSD service starts, each device may register a scan filter by using information (e.g., a line ID) on the call-linked server 330 (e.g., an entitlement server) known to each device. A BLE packet 1300 may include information such as a line ID 1310, a line version, a channel, and an authentication port, and the scan filter may perform registration by using the information. For example, the BLE packet transmitted as an advertising packet by the electronic device 101 may be filtered by a filter having the same line ID, and only packets including the same line ID may be received.

Figure 13:
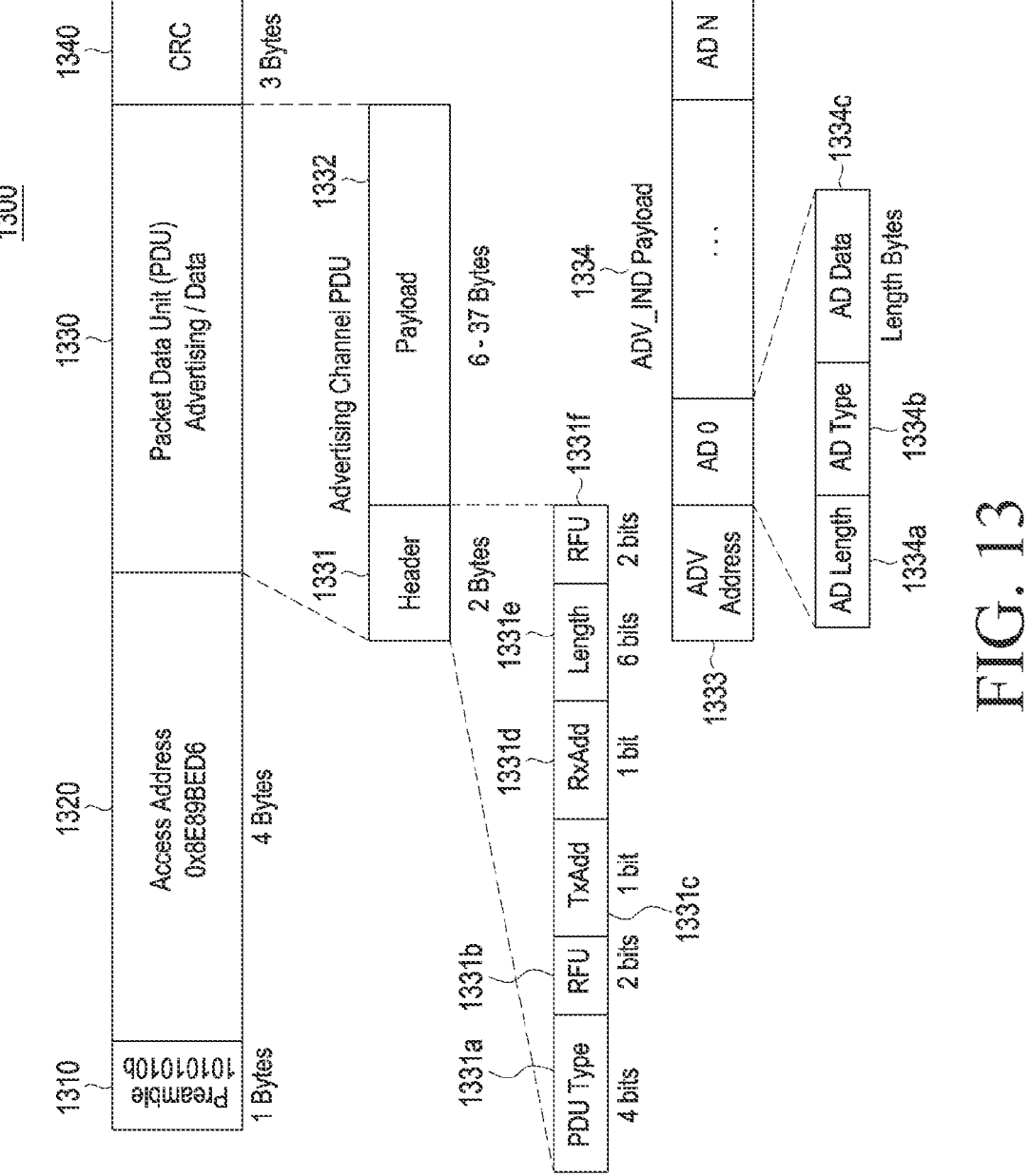
FIG. 13 is a diagram illustrating an advertising packet transmitted from an electronic device according to various embodiments.

FIG. 13 is a diagram illustrating an advertising packet transmitted from an electronic device according to various embodiments. Referring to FIG. 13, an advertising packet 1300 may include a preamble 1310, an access address 1320, advertising data as a packet data unit (PDU) 1330, and a CRC 1340. Advertising data as the PDU 1330 may include a header 1331 and a payload 1332. The header 1331 of the advertising data 1330 may include a PDU type 1331a, an RFU 1331b, a transmitter address 1331c, a receiver address 1331d, a length 1331e, and an RFU 1331f. The PDU 1330 may include an advertising address 1333 and an advertising payload 1334. The advertising payload 1334 may include an advertising length 1334a, an advertising type 1334b, and advertising data 1334c.

According to various embodiments, the BLE packet may include data fields as illustrated in Table 2 below.

TABLE 2

```
BLE Packet {
    Line ID
    Line version
    Channel
    Authentication port
}
```

According to various embodiments, when the BLE packet is received, an SSID password is generated by using a password seed and a GUID of an operator account, and the first external electronic device 310 may attempt to connect to the WI-FI direct group generated by the electronic device 101. Because the first external electronic device 310 already knows the SSID and channel by receiving the packet, the connection speed may be improved by immediately attempting connection by the first external electronic device 310 without attempting WI-FI SSID scanning According to various embodiments, when successfully connected to the WI-FI direct group, the IP of the electronic device 101 may be obtained through the WI-FI group, and the authentication process an authentication procedure may be performed through a secure channel by using the authentication port obtained from the BLE packet. As a result of the authentication, when the authentication is successfully performed, each service application may be notified.

The BLE packet is included in the Advertising Payload (31 bytes) in the Packet Data Unit 1330, and the available data size is about 25 bytes except for the reserved area. The data of the BLE packet 1300 may include data fields as illustrated in FIG. 13.

Figure 14:
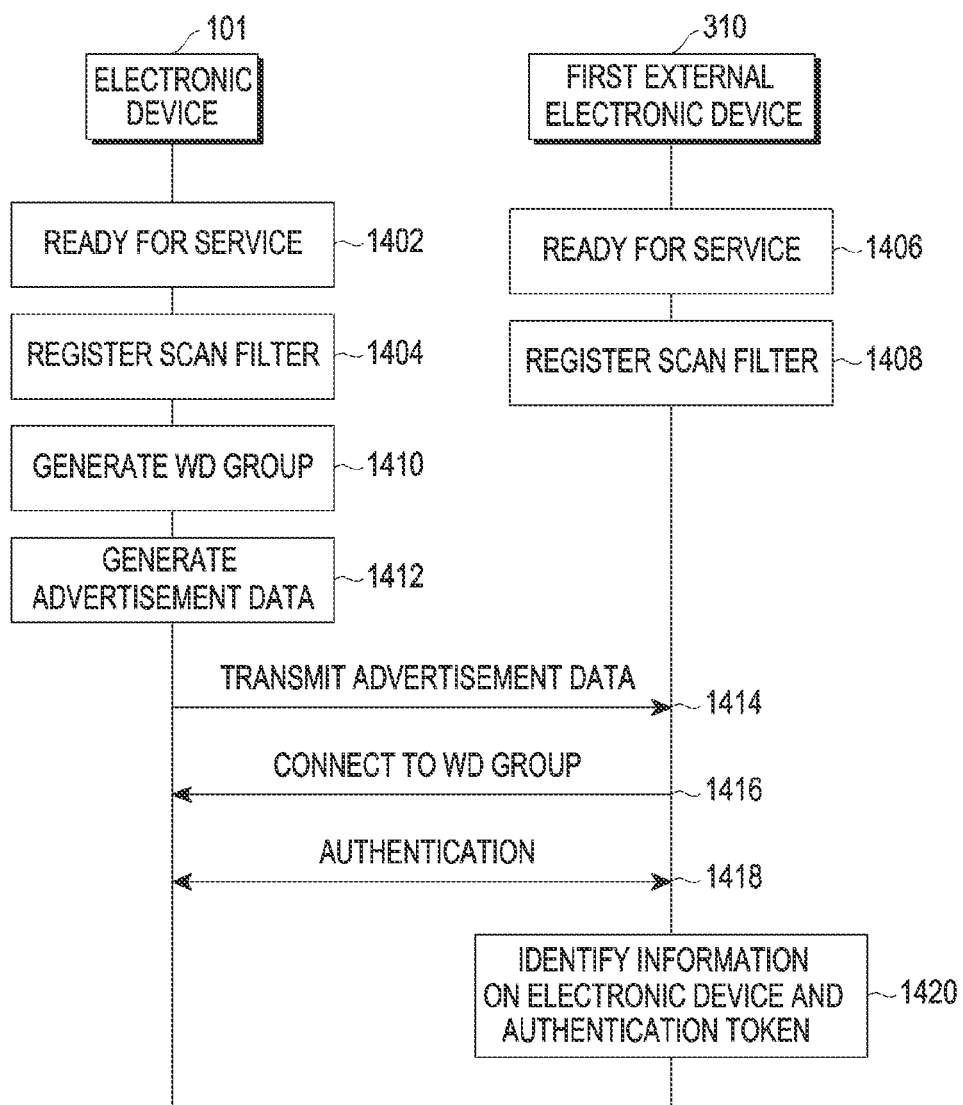
FIG. 14 is a flowchart illustrating operations between devices according to various embodiments.

FIG. 14 is a flowchart illustrating operations between devices according to various embodiments. Referring to FIG. 14, the first external electronic device 310 may request a connection from a nearby device through BLE. According to various embodiments, when the NSD service is prepared in operation 1402, the electronic device 101 may register a scan filter, based on information obtained from the entitlement server in operation 1404. When the NSD service is prepared in operation 1406, the first external electronic device 310 may register a scan filter, based on information obtained from the entitlement server in operation 1408.

According to various embodiments, the electronic device 101 may request the NSD that a Wi-Fi direct connection is required in a service application. In operation 1410, the NSD of the electronic device 101 receiving the request may generate a WI-FI direct (WD) group as the group owner (GO). The SSID and SSID password promised in the generation process may be specified.

According to various embodiments, in operation 1412, the electronic device 10 may generate advertisement data by combining a plurality of pieces of information (e.g., Line ID, Line Version, Channel, Authentication Port) as illustrated in FIG. 13. The electronic device 101 may transmit the generated advertisement data to the first external electronic device 310 in operation 1414. The first external electronic device 310 may receive the BLE packet in operation 1416, and connect to a WI-FI direct group through a specified SSID, SSID password, and channel.

According to various embodiments, when a Wi-Fi direct connection is generated, an SSL connection may be attempted through an authentication port, and an authentication procedure may be performed between each other in operation 1418 after the connection. When the authentication is completed, the electronic device 101 and the first external electronic device 310 may know that they are in the same WI-FI direct group (e.g., the same network), and identify the IP address and/or authentication token of the electronic device 101. When the authentication is passed, the first external electronic device 310 may transmit the identified information to each service application to notify that the electronic device 101 has been found in the same network.

Figure 15:
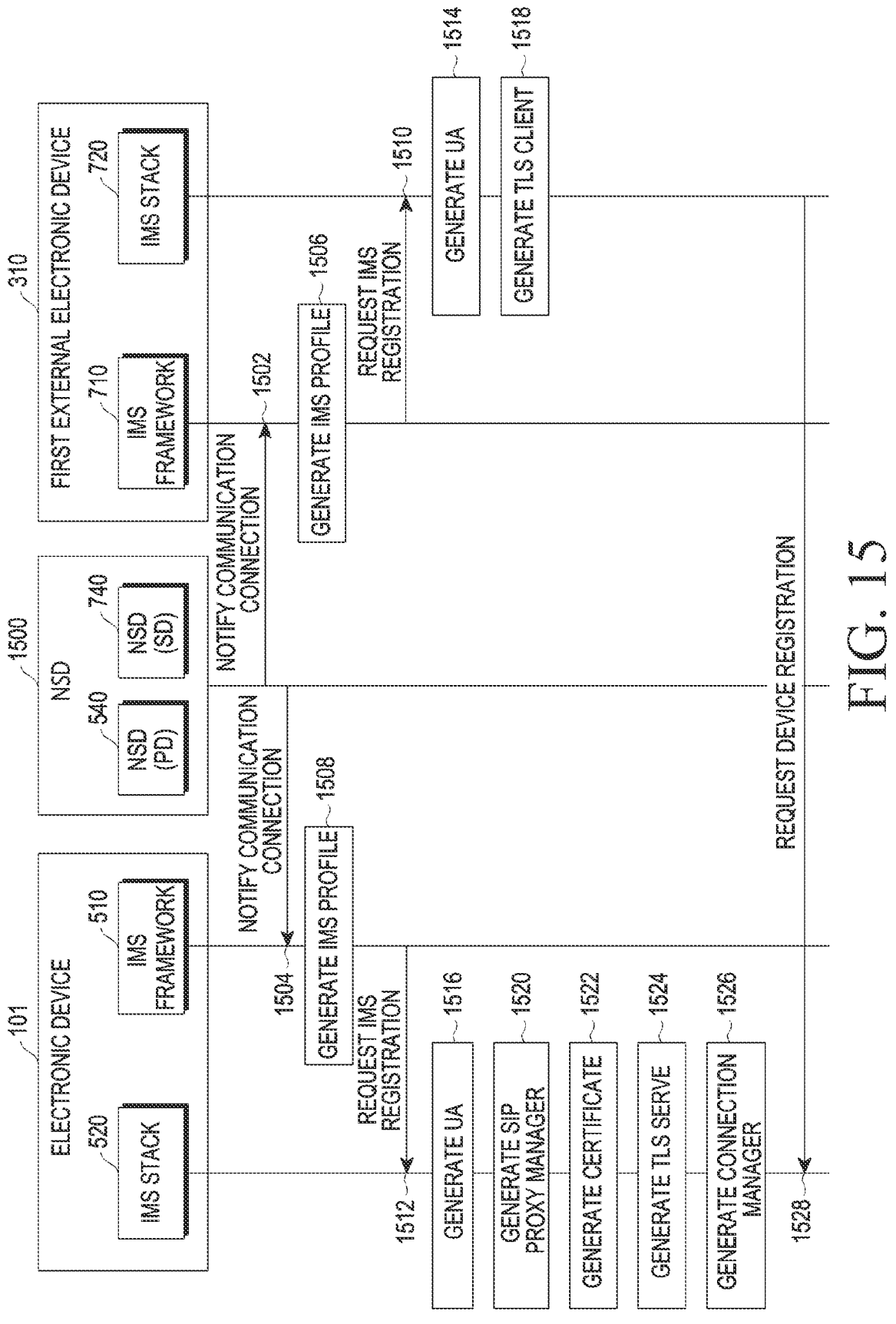
FIG. 15 is a flowchart illustrating operations between devices according to various embodiments.

FIG. 15 is a flowchart illustrating operations between devices according to various embodiments. Referring to FIG. 15, the D2D connected electronic device 10 and the first external electronic device 310 may generate an IMS server and an IMS client therein.

According to various embodiments, when the electronic device 101 and the first external electronic device 310 exist in the same WI-FI zone through the NSD as described above, or the electronic device 101 and the first external electronic device 310 are connected through the WIFI-DIRECT/BT/MOBILE-HOTSPOT interface, the electronic device 101 may perform an internal server generation operation, which is a starting point for D2D communication. In FIG. 15, the NSD 1500 is illustrated as a block separate from the electronic device 101 or the first external electronic device 310 for convenience of explanation, but the NSD 540 of the electronic device 101 among the NSDs 1500 may be included in the electronic device 101 as illustrated in FIG. 7A, and the NSD 740 of the first external electronic device 310 may be included in the first electronic device 310.

According to various embodiments, when the electronic device 101 and the first external electronic device 310 are in the same network (e.g., the same WIFI area), in operations 1502 and 1504, a notification (e.g., OnWifiStateChanged) message indicating that a communication connection between the electronic device 101 and the first external electronic device 310 has been generated may be received from the NSD 1500. According to various embodiments, the notification message received from the NSD 1500 may include an IP address of the electronic device 101 to be registered and a unique authentication token value promised between the electronic device 101 and the first external electronic device 310. The electronic device 101 and the first external electronic device 310 may perform a registration by including the device's unique ID (e.g., a device ID) previously obtained from the entitlement server, like the information included in the notification message. For example, the device ID may be a unique ID value provided by the entitlement server when logging in to the operator account server is completed. Each of the electronic devices 101 and the first external electronic devices 310 may be distinguished through the device ID. According to various embodiments, the IMS framework 510 of the electronic device 101 may generate an IMS profile object in operation 1508, and transmit an IMS registration request to the IMS stack, based on the generated profile object information in operation 1512. The reason why the electronic device 101 performs the IMS registration procedure is to generate an internal communication path between the IMS framework 510 and the IMS stack 520 as described above, and the IMS stack 520 may be requested to generate a D2D internal server through the registration procedure.

According to various embodiments, when recognizing a registration request for D2D, the IMS stack 520 of the electronic device 101 may finally generate a TLS server object 535 for communication with the first external electronic devices 310, and generate a connection manager 536 for managing connections between each of the first external electronic devices 310. For example, the IMS stack 520 may generate a UA (e.g., the P2P UA 531) in operation 1516, and generate the SIP proxy manager 532 in operation 1520. The IMS stack 520 may generate a certification in operation 1522, the TLS server object 535 in operation 1524, and the connection manager 536 in operation 1526. After performing the above procedures, the electronic device 101 may be considered ready to accept the connection request from the first external electronic device 310. According to various embodiments, the registration request for D2D transmitted to the IMS stack 520 in operation 1512 may include the following information. In the following information, the CMC_TYPE value may indicate in which D2D type the corresponding device should operate.

CMC_WIFI_TYPE_PRIMARY: Means a D2D type value using a WI-FI interface in the electronic device 101.

CMC_WIFI_TYPE_SECONDARY: Means a D2D type value using a WI-FI interface in the first external electronic device 310.

CMC_WIFI_HS_TYPE_PRIMARY: Means a D2D type value using MOBILE-HOTSPOT in the electronic device 101.

CMC_WIFI_HS_TYPE_SECONDARY: Means a D2D type value using MOBILE-HOTSPOT in the first external electronic device 310.

CMC_WIFI_DIRECT_TYPE_PRIMARY: Means a D2D type value using WI-FI-DIRECT in the electronic device 101.

CMC_WIFI_DIRECT_TYPE_SECONDARY: Means a D2D type value using WI-FI-DIRECT in the first external electronic device 310.

CMC_BT_TYPE_PRIMARY: Means a D2D type value using BT in the electronic device 101.

CMC_BT_TYPE_SECONDARY: Means a D2D type value using BT in the first external electronic device 310.

The PROFILE_TYPE value may indicate whether the corresponding device operates as the D2D electronic device 101 or the first external electronic device 310.

PROFILE_NONE: Means IMS registration not supporting D2D.

PROFILE_P2P_PD: means IMS registration in the electronic device 101 supporting D2D.

PROFILE_P2P_SD: means IMS registration in the first external electronic device 310 supporting D2D.

According to various embodiments, when the layer of the IMS STACK 520 is subdivided, it may be divided into a manager layer (e.g., a CORE layer) and a RESIP layer for each function.

According to various embodiments, the registration SIP received from the first external electronic device 310 to the electronic device 101 may include the device ID of the corresponding first external electronic device 310. Thereafter, the device ID of the first external electronic device 310 may be used as information for the electronic device 101 to identify each of the first external electronic devices 310. The registration SIM may include an authentication token value (e.g., an access token) that the electronic device 101 and the first external electronic device 310 have in common. If the access token value received from the first external electronic device 310 does not match the access token currently possessed by the electronic device 101, the electronic device 101 may reject the request while responding with a 403 error.

According to various embodiments, the IMS framework 710 of the first external electronic device 310 may generate an IMS profile object in operation 1506 and transmit an IMS registration request to the IMS stack, based on the generated profile object information in operation 1510. The first external electronic device 310 may generate an IMS client in the IMS stack 720 through the IMS registration procedure. For example, upon receiving the IMS registration request, the IMS stack 720 may generate a UA in operation 1514 and a TLS client in operation 1518.

According to various embodiments, as described above with reference to FIG. 5, the manager layer (e.g., the CORE layer) may include the UA objects 521, 522, and 531. The UA object may be generated, based on IMS registration information transmitted from the framework layer. The UA object may include a default IMS profile and D2D-specific information, and based on the information, the electronic device 101 may generate a TLS server object 535 within the RESIP layer. A communication protocol supported by the TLS server object 535 may be TCP/UDP/TLS type. According to various embodiments, the first external electronic device 310 may generate a TLS client object having the same or similar communication protocol (e.g., TLS) as the electronic device 101, and request a TLS connection from the electronic device 101 through the TLS client object.

According to various embodiments, D2D information may be transferred to the SIP proxy manager 532 so that SIP routing between the electronic device 101 and the first external electronic device 310 may be performed thereafter. The SIP proxy manager 532 may serve as a routing role of the SIP transmitted from the electronic device 101 to the first external electronic device 310. The SIP proxy manager 532 may generate new SIPs necessary for D2D operation as needed, and perform a role of exchanging the SIPs with the first external electronic devices 310. The SIP proxy manager 532 may check the CMC type received from the UA and call session manager 533 to determine operations to be performed according to the corresponding type. Operations involving the SIP proxy manager 532 may include registration processing, call processing, and subscription processing.

According to various embodiments, the manager layer (e.g., the CORE layer) may include a P2P device object (P2pDevice) or a CMC call object (CmcCall) to support registration of each communication interface and call processing functions. The P2P device object may internally manage a P2P call object. The CMC call object may store a call object received through the call-linked server 330 (e.g., the CMC server), and the P2P device object may store information of the first external electronic devices 310 received through the D2D connection.

According to various embodiments, the RESIP layer may receive requests from the manager layer (e.g., the CORE layer). For example, the RESIP layer may generate a TLS server object to operate as a server. The RESIP layer may receive a role together with the server generation request to distinguish what purpose the TLS server is generated for. According to various embodiments, SSL authentication may be required for the electronic device 101 to operate as a server having a TLS communication protocol. For example, a certification may be required because it is generated in the form of an internal server within the electronic device 101 itself, which may be made in the form of a self-certification. The SIP stack may request the secure object to generate a certification for the above operations, and may pre-load the generated certification information into the secure object. The security object is an object related to TLS SSL authentication and may generate a certification of the type requested from the SIP stack and store information within the object. In D2D, the certification may be generated as a domain certification type, and as described above in FIG. 5, and may be generated as a file with a PEM extension. The corresponding PEM files may be used as authentication information in a TLS handshake between the electronic device 101 and the first external electronic device 310.

According to various embodiments, the TLS server object 535 may include information on what operation the TLS server object should perform. For example, when the TLS server object 535 includes ROLE_CMC_SERVER(1), it may serve as a server for D2D in the electronic device 101. The "TcpBaseTransport object" may detect a connection request from the first external electronic device 310, and process a new connection, organize an old connection, or regenerate a new connection. For example, even if the Wi-Fi connection is disconnected from the first external electronic device 310, the electronic device 101 may not know the situation of the first external electronic device 310. Subsequently, when a WI-FI connection is established in the first external electronic device 310 and a new registration request is received, the object may organize the existing connection and connect the corresponding first external electronic device 310 through the new connection. The "BaseTransport object" may request the security object to apply information necessary for SSL authentication when generated. The connection manager 536 may configure a map for each IP address and port for the D2D connection requests received from the first external electronic device 310 and store connection information. The information managed by the connection manager 536 may be used later when the electronic device 101 transmits a SIP with a new transaction ID. For example, in order to determine which D2D-connected first external electronic device 310 to transmit when transmitting the SIP, a destination to be received may be determined by searching for connection information stored in the IP address and the port map.

Figure 16:
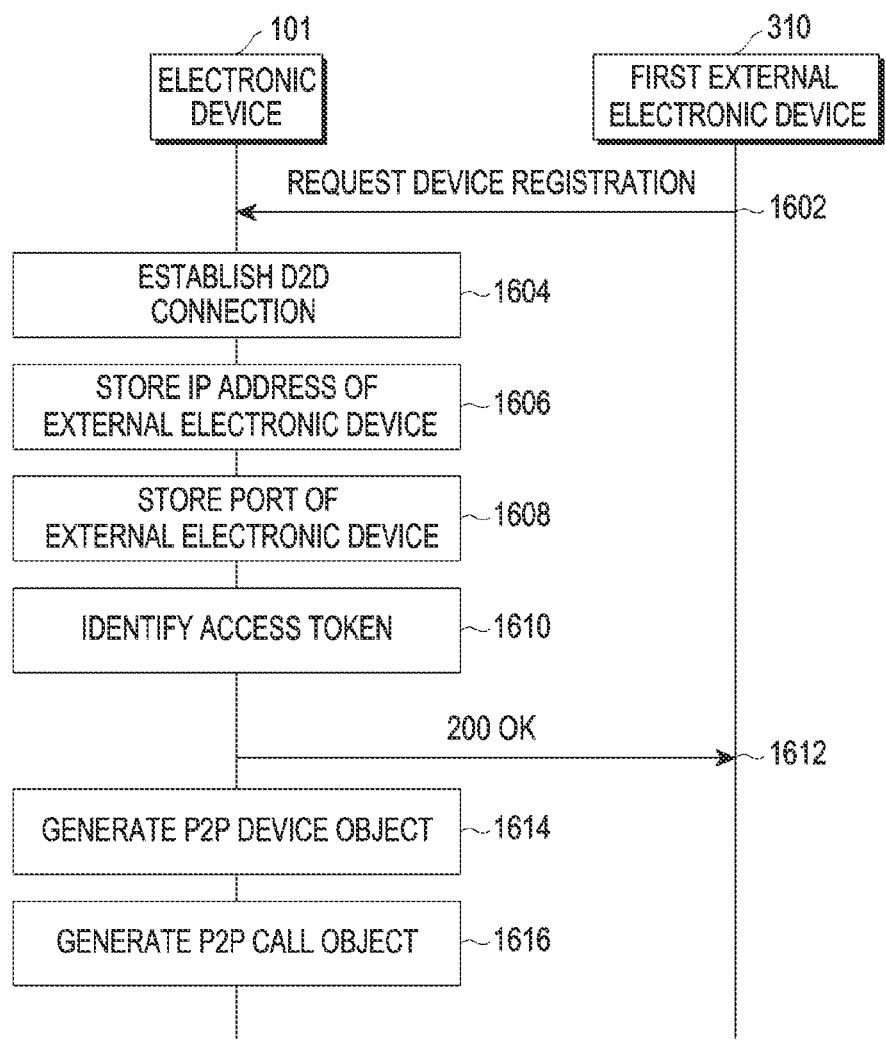
FIG. 16 is a flowchart illustrating operations between devices according to various embodiments.

FIG. 16 is a flowchart illustrating operations between devices according to various embodiments. Referring to FIG. 16, when ready to accept a D2D connection request, the electronic device 101 may receive a device registration request (e.g., a TLS protocol connection request) from the first external electronic device 310 in operation 1602.

According to various embodiments, the RESIP layer in the electronic device 101 may generate a connection object to be connected to the corresponding first external electronic device 310 and transmit SSL authentication information to the first external electronic device 310 through the generated connection. The first external electronic device 310 may identify the SSL authentication by referring to SSL authentication information received from the electronic device 101 and SSL information within the TLS connection. For example, the electronic device 101 may establish a D2D connection in operation 1604 and store the IP address and port of the first external electronic device in operations 1606 and 1608. The electronic device 101 may identify the access token in operation 1610 and transmit an OK message (e.g., the SIP 200 OK message) to the first external electronic device 310 in operation 1612.

For example, when the electronic device 101 identifies authentication of the first external electronic device 310, the TLS connection between the electronic device 101 and the first external electronic device 310 may be completed. Thereafter, a device registration request (e.g., REGISTER SIP) may be received from the first external electronic device 310 through the completed TLS connection. The REGISTER SIP may be transmitted to the manager layer (e.g., the CORE layer) of the electronic device 101, and may determine whether the corresponding first external electronic device 310 is a device registered with the electronic device 101 through universally unique identifier (UUID) information included in an access token field among data fields included in the SIP. When it is identified whether the UUID information stored in the electronic device 101 matches the UUID information transmitted from the first external electronic device 310 match, if they match, an OK message (e.g., the SIP 200 OK message) may be transmitted, and if they do not match, a 403 FORBIDDEN response may be delivered in operation 1612.

According to various embodiments, the IMS registration procedure between the electronic device 101 and the first external electronic device 310 may be completed by the above procedure, and then, the electronic device 101 may generate a P2P device object (P2pDevice) and a P2P call object (P2pCall) in operations 1614 and 1616 based on the connection information. The generated objects may manage call information of each first external electronic device 310, based on information on corresponding objects during call forking. The generated objects may also be used as target information to be transmitted when the electronic device 101 performs call forking to the first external electronic device 310.

Figure 17:
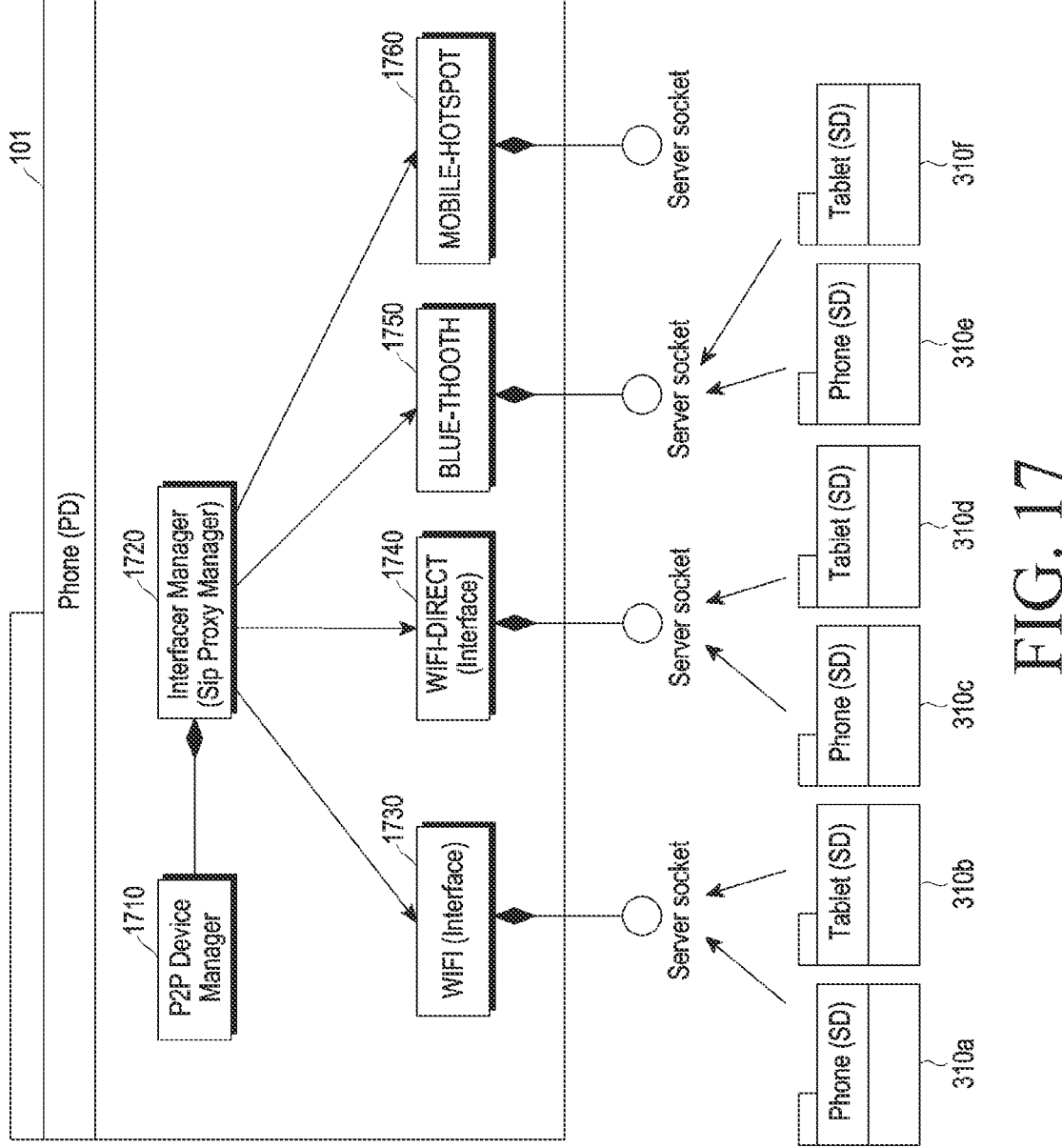
FIG. 17 is a diagram illustrating objects generated in an electronic device according to various embodiments.

FIG. 17 is a diagram illustrating objects generated in an electronic device according to various embodiments. Referring to FIG. 17, an object configuration for managing each of the first external electronic devices 310a to 310f (collectively referred to as 310) connected through different interfaces of the IMS stack layer in the electronic device 101 is illustrated.

The manager layer (e.g., the CORE layer) within the IMS stack layer may include an interface 1720 (e.g., the SIP proxy manager 532) and a P2P device manager 1710 to manage basic information of the first external electronic device 310 (SD).

P2pDevice::mDeviceId: Means unique device ID information of SD

P2pDevice::mCmcType: Means SD interface type information

P2pDevice::mActiveSlot: D2D call may support a total of 2 calls simultaneously and means the currently active call slot P2pDevice::mP2pProfile: Means D2D IMS profile object received from the frame layer P2pDevice::mP2pCall: Means a call object to store SD call information SipProxyMgr::mP2pDeviceMap: means a list of P2P device objects having information on SDs connected to the electronic device 101

The RESIP layer in the IMS stack layer may include a connection manager 536 object to manage connection information of connected SDs.

ConnectionManager::mIpAddressMap: Means peer IP address list of SDs

ConnectionManager::mPortMap: Means peer port list of SDs

The P2P device manager 1710 may include information of each SD, and among which, include the device ID and P2P profile structure information as information used to distinguish SDs in the electronic device 101.

As described above, the device ID may refer to a terminal-specific ID, and the P2P profile structure may include interface information to which the SD is connected. For example, as illustrated in FIG. 17, the first SD 310a and the second SD 310b may be connected to a Wi-Fi interface 1730, the third SD 310c and the fourth SD 310d may be connected to a Wi-Fi direct interface 1740, and the fifth SD 310e and the sixth SD 310f may be connected to a Bluetooth interface 1750. It may be seen that any SD is not yet connected to a mobile hotspot interface 1760. As described above, the P2P profile structure in the P2P device manager 1710 may include interface information (e.g., Wi-Fi, Wi-Fi direct, Bluetooth, mobile hotspot) to which SDs are connected, as illustrated in FIG. 17. The P2P profile structure may include object information, IP, and ports for accessing at least the connected TLS connection.

According to various embodiments, a Wi-Fi direct (WD) operation method in D2D service may operate differently from other interfaces. For example, WI-FI, BT, and mobile hotspot may pre-configure an IMS connection between the electronic device 101 and the first external electronic device 310 (SD) to receive a call, and then transmit and receive SIP through a connection when making a call or an incoming call is received from the second external electronic device 320 (ED).

According to various embodiments, the Wi-Fi direct (WD) connection method may be similar to other methods, but the battery may be quickly consumed due to current consumption of the Wi-Fi direct connection in an idle state. To solve this problem, when the electronic device 101 detects an incoming call or the first external electronic device 310 makes a call, a WD connection between the electronic device 101 and the first external electronic device 310 may be established through the NSD. According to the above operation, the electronic device 101 and the first external electronic device 310 may process real-time IMS registration and call reception and transmission when a call occurs. According to various embodiments, when the call is terminated, the WD connection may be released again.

Figure 18:
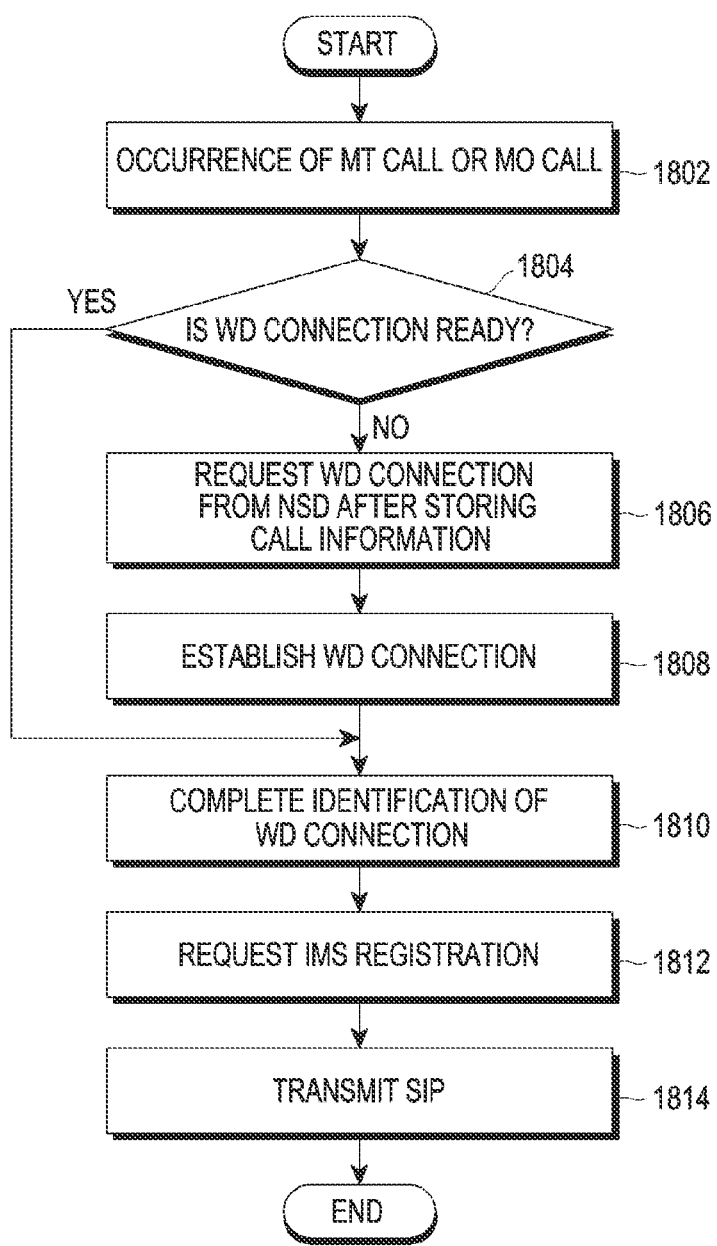
FIG. 18 is a flowchart illustrating operations between devices according to various embodiments.

FIG. 18 is a flowchart illustrating operations between devices according to various embodiments. Referring to FIG. 18, the electronic device 101 may detect the occurrence of an MT call or a MO call in operation 1802. The MO call may include a case in which the first external electronic device 310 makes a call. The MT call may include a case in which the electronic device 101 receives a call made by the second external electronic device 320.

According to various embodiments, in operation 1804, the electronic device 101 may identify whether a WD connection is ready. As a result of the identification, when the WD connection is not ready (operation 1804—No), the electronic device 101 may store call information in operation 1806 and then request the WD connection from the NSD. In operation 1808, the electronic device 101 may establish the WD connection by the NSD. The electronic device 101 may complete identification of the WD connection. As a result of the identification, when the WD connection is ready (operation 1804—Yes), the electronic device 101 may complete identification of the WD connection in operation 1810.

According to various embodiments, when it is identified that the WD connection between the electronic device 101 and the first external electronic device 310 is completed, IMS registration may be requested in operation 1812. When the IMS registration is completed, in operation 1814, the electronic device 101 may transmit a SIP message to the first external electronic device 310 in order to call fork the received MT call to the first external electronic device 310, or transmit the SIP message to send a call made from the first external electronic device 310 to the second external electronic device 320.

Figure 19:
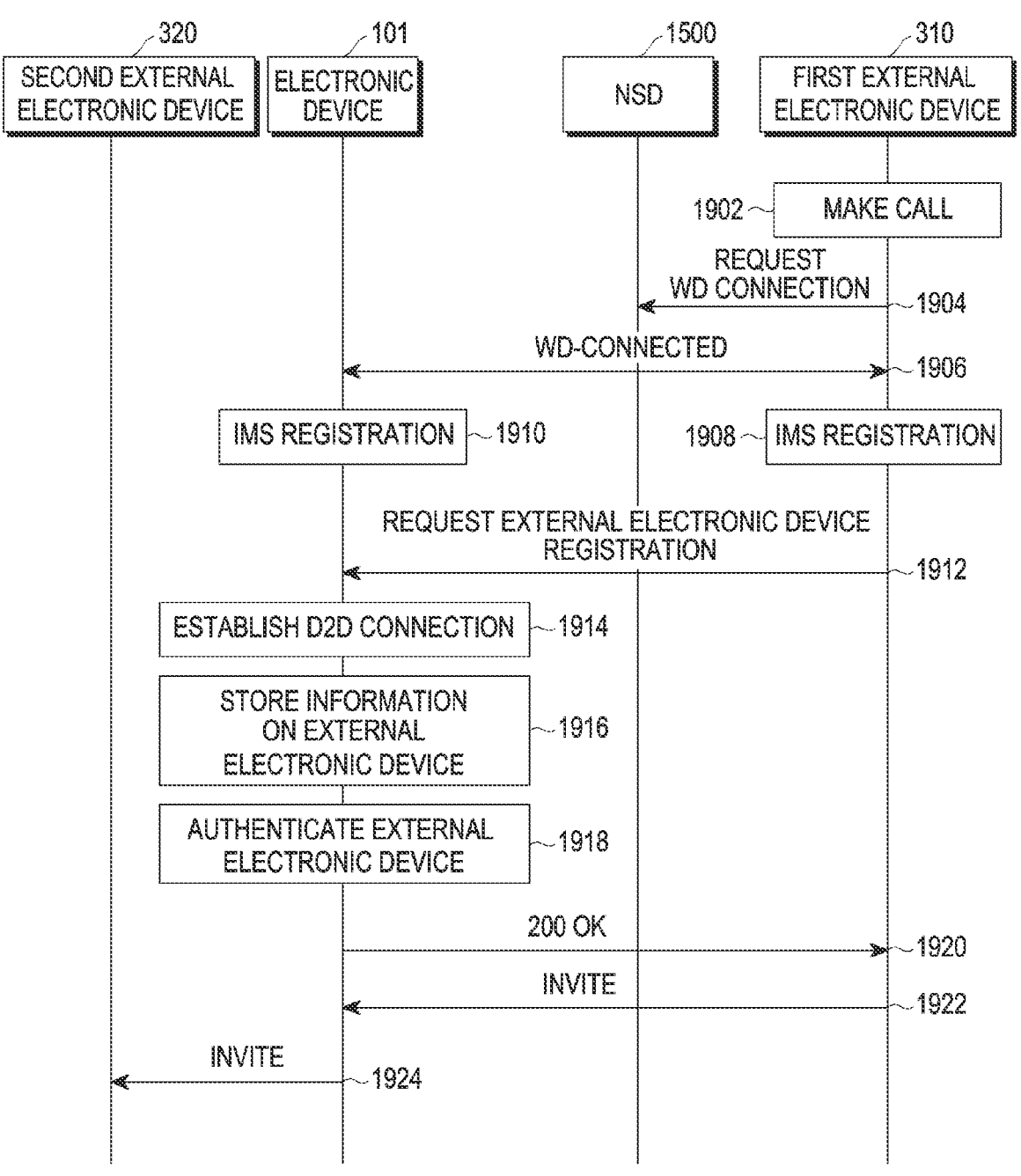
FIG. 19 is a flowchart illustrating operations between devices according to various embodiments.

FIG. 19 is a flowchart illustrating operations between devices according to various embodiments. In FIG. 19, the NSD 1500 is illustrated as a separate block from the electronic device 101 or the first external electronic device 310 for convenience of description, but among the NSDs 1500, the NSD 540 of the electronic device 101 may be included in the electronic device 101 as illustrated in FIG. 7A and the NSD 740 of the first external electronic device 310 may be included in the first external electronic device 310.

Referring to FIG. 19, the first external electronic device 310 may make a call in operation 1902. For example, when the electronic device 101 and the first external electronic device 310 support D2D services through WD and a call is made as described above in a state in which there is no connection between the electronic device 101 and the first external electronic device 310, the WD connection procedure may be performed first.

According to various embodiments, the first external electronic device 310 may request a WD connection from the NSD 1500 according to the making a call in operation 1904. In operation 1906, the first external electronic device 310 and the electronic device 101 may be WD-connected through the NSD 1500. After connecting to the WD, in order to provide the IMS service, the first external electronic device 310 and the electronic device 101 may perform IMS registration in operations 1908 and 1910, respectively. The IMS registration procedure may be the same as or similar to operations 1508 to 1526 of FIG. 15.

According to various embodiments, when the IMS registration is completed, the first external electronic device 310 may request registration of the first external electronic device 310 from the electronic device 101 in operation 1912. For example, the RESIP layer in the electronic device 101 may generate a connection object to be connected to the corresponding first external electronic device 310 in operation 1914, and deliver SSL authentication information to the first external electronic device 310 through the generated connection. The first external electronic device 310 may identify the SSL authentication by referring to SSL authentication information received from the electronic device 101 and SSL information within the TLS connection. For example, the electronic device 101 may establish a D2D connection in operation 1914, and store information (e.g., an IP address and port) of the first external electronic device 310 in operation 1916. The electronic device 101 may identify the access token in operation 1918 to authenticate the first external electronic device 310 and transmit an OK message (e.g., the SIP 200 OK message) to the first external electronic device 310 in operation 1920.

For example, when the electronic device 101 identifies authentication of the first external electronic device 310, the TLS connection between the electronic device 101 and the first external electronic device 310 may be completed. Thereafter, a device registration request (e.g., REGISTER SIP) may be received from the first external electronic device 310 through the completed TLS connection. The REGISTER SIP may be transmitted to the manager layer (e.g., the CORE layer) of the electronic device 101, and may determine whether the corresponding first external electronic device 310 is a device registered with the electronic device 101 through universally unique identifier (UUID) information included in an access token field among data fields included in the SIP. When it is identified whether the UUID information stored in the electronic device 101 matches the UUID information transmitted from the first external electronic device 310 match, if they match, an OK message (e.g., the SIP 200 OK message) may be transmitted, and if they do not match, a 403 FORBIDDEN response may be delivered in operation 1920.

According to various embodiments, when IMS registration between the electronic device 101 and the first external electronic device 310 is completed, the first external electronic device 310 may generate a call session and transmit an INVITE to the electronic device 101 in operation 1922 through the interface connected above. The electronic device 101 may transmit the INVITE to the second external electronic devices 320 (ED) in operation 1924, and thus a call forking may be performed.

Figure 20:
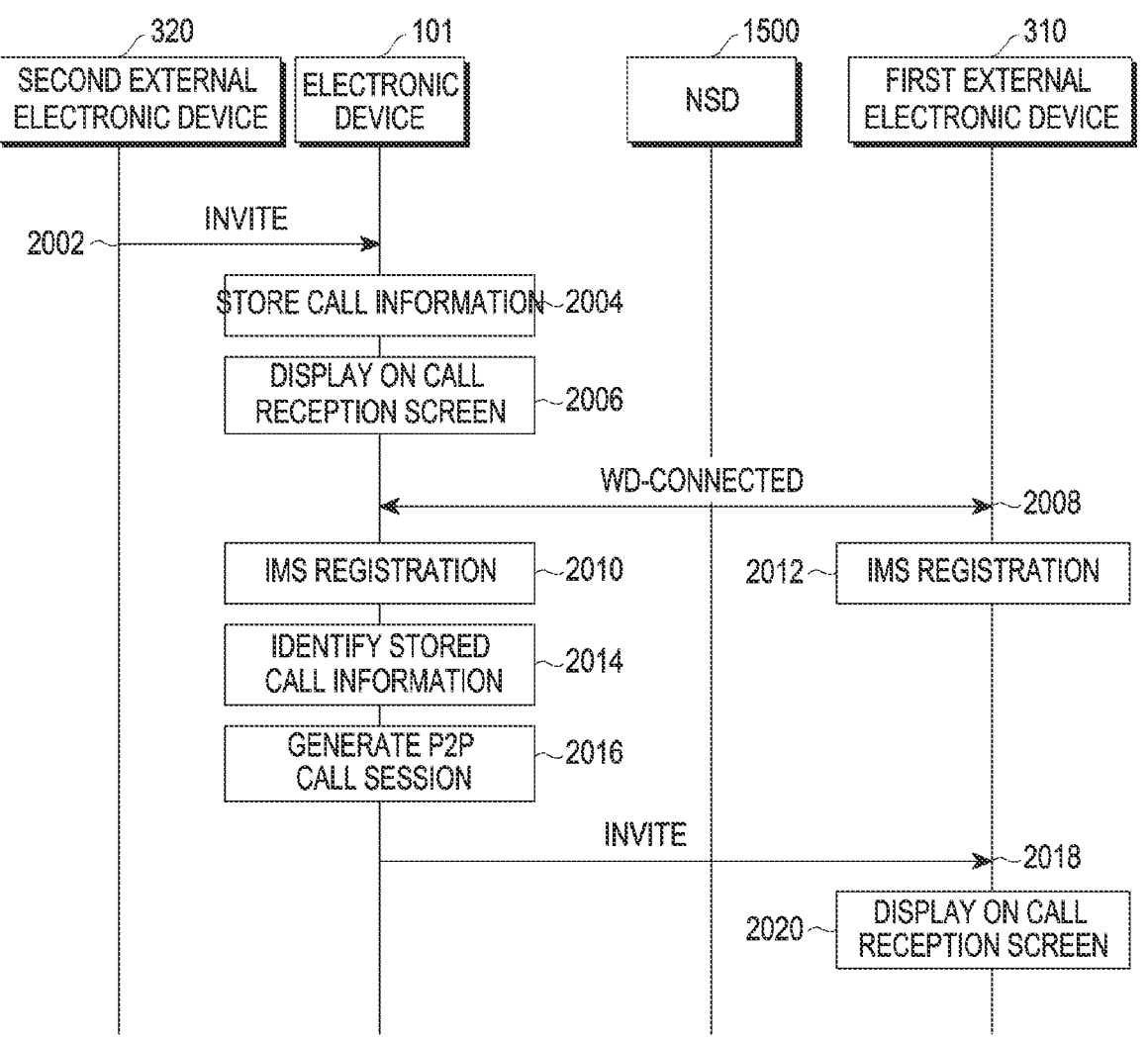
FIG. 20 is a flowchart illustrating operations between devices according to various embodiments.

FIG. 20 is a flowchart illustrating operations between devices according to various embodiments. In FIG. 20, the NSD 1500 is illustrated as a separate block from the electronic device 101 or the first external electronic device 310 for convenience of description, but among the NSDs 1500, the NSD 540 of the electronic device 101 may be included in the electronic device 101 as illustrated in FIG. 7A and the NSD 740 of the first external electronic device 310 may be included in the first external electronic device 310.

Referring to FIG. 20, in a state in which there is no connection between the electronic device 101 and the first external electronic device 310, the electronic device 101 may receive an INVITE message corresponding to an incoming call from the second external electronic device 320 in operation 2002. According to various embodiments, the electronic device 101 may store information on the incoming call in operation 2004 and display a call reception screen in operation 2006.

According to various embodiments, because the electronic device 101 is not connected with the first external electronic device 310, the electronic device 101 may request a Wi-Fi direct (WD) connection from the NSD 1500. According to the request, the WD connection between the electronic device 101 and the first external electronic device 310 may be completed in operation 2008 by the NSD 1500. According to the WD connection, the electronic device 101 and the first external electronic device 310 may perform IMS registration procedures in operations 2010 and 2012, respectively. The IMS registration procedure may be the same as or similar to operations 1508 to 1526 of FIG. 15.

According to various embodiments, when the IMS registration is completed, the electronic device 101 may identify the call information stored in operation 2004 and additionally generate a P2P call session in operation 2016 by using the identified call information. According to various embodiments, the electronic device 101 may transmit an INVITE message to the first external electronic device 310 in operation 2018 through an interface with the first external electronic device 310 generated through the WD connection. According to various embodiments, the first external electronic device 310 may receive each corresponding INVITE message and display a call reception screen on the screen. For example, a call reception screen identical to or similar to that of the electronic device 101 may be displayed on the screen of the first external electronic device 310.

Figure 21:
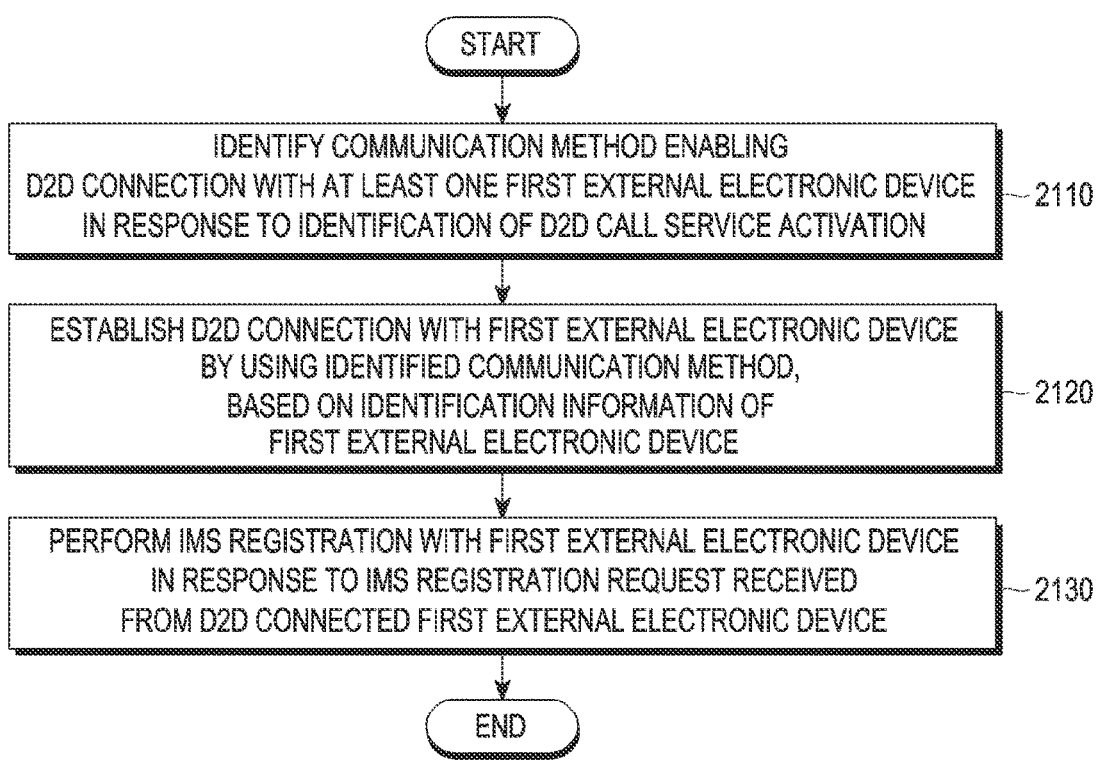
FIG. 21 is a flowchart illustrating an operation of an electronic device according to various embodiments.

FIG. 21 is a flowchart illustrating an operation of an electronic device according to various embodiments. Referring to FIG. 21, in operation 2110, the electronic device 101 may identify a communication method capable of a D2D connection with at least one first external electronic device 310 in response to identification of the D2D call service activation.

According to various embodiments, the electronic device 101 may establish a D2D connection with the first external electronic device 310 by using the identified communication method in operation 2120, based on the identification information of the first external electronic device 310. For example, the communication method may include a short-range communication method, and include at least one of Wi-Fi, Wi-Fi direct (WD), mobile hotspot, Bluetooth (BT), and Bluetooth Low Energy (BLE).

According to various embodiments, in operation 2130, the electronic device 101 may perform IMS registration with the first external electronic device 310 in response to the IMS registration request received from the D2D connected first external electronic device 310. According to various embodiments, as described above, the electronic device 101 may operate as an IMS server according to the IMS registration, and the first external electronic device 310 may operate as an IMS client according to the IMS registration. By the IMS registration of the electronic device 101 and the first external electronic device 310, the first external electronic device 310 may receive the IMS service through the electronic device 101. For example, the first external electronic device 310 may receive an IMS call transmitted from the second external electronic device 320 through the electronic device 101 or make an IMS call to the second external electronic device 320.

An electronic device (e.g., the electronic device 101 and the UE 601) according to any one of various embodiments may include at least one antenna module (e.g., the antenna module 197, the first antenna module 242, the second antenna module 244, and the third antenna module 246), at least one short-range communication module (e.g., the wireless communication module 192), at least one processor (e.g., the processor 120 and the integrated communication processor 260) connected to the antenna module and the at least one short-range communication module, and a memory (e.g., the memory 130) connected to the at least one processor, and the memory, during the execution thereof, may store instructions which cause the processor to register the electronic device to an IP multimedia subsystem (IMS) server through the at least one antenna module, identify a short-range communication method capable of a device to device (D2D) connection with at least one first external electronic device, connect, through the identified short-range communication method, to the at least one first external electronic device through the at least one short-range communication module, based on identification information of the first external electronic device, and process an IMS registration for the first external electronic device in response to an IMS registration request received from the first external electronic device through the at least one short-range communication module.

According to various embodiments, the instructions may be configured to allow the processor to identify a short-range communication method capable of the D2D connection with at least one first external electronic device in response to a D2D service activation identification.

According to various embodiments, the D2D service activation identification may be identified by at least one of a product identification number of the electronic device, mobile country code (MCC)/mobile network code (MNC) information stored in a subscriber identification module (SIM), or public land mobile network (PLMN) information.

According to various embodiments, the short-range communication method may include at least one of Wi-Fi, Wi-Fi direct (WD), mobile hotspot, Bluetooth (BT), and Bluetooth low energy (BLE).

According to various embodiments, the instructions may be configured to allow the processor to generate a transport layer security (TLS) server module corresponding to the IMS server in the electronic device in response to the connection with the at least one first external electronic device.

According to various embodiments, the instructions may be configured to allow the processor to establish a Wi-Fi direct group connection for a D2D service when the at least one first external electronic device does not exist in the same Wi-Fi network as the electronic device as a result of identifying the connectable short-range communication method, broadcast advertisement data including information corresponding to the D2D service, and connect with the first external electronic device through Wi-Fi Direct in response to receiving a message for group connection transmitted from at least one first external electronic device that has received the broadcasted advertisement data.

According to various embodiments, the information corresponding to the D2D service may include information corresponding to an external server that provides a call connection service.

According to various embodiments, the instructions may be configured to allow the processor to connect with the at least one first external electronic device through a Wi-Fi direct communication method in response to receiving an IMS call for a second external electronic device from the at least one first external electronic device.

According to various embodiments, the instructions may be configured to allow the processor to process an IMS registration for the first external electronic device in response to being connected with the at least one first external electronic device through a Wi-Fi direct communication method. According to various embodiments, the instructions may be configured to allow the processor to store interface information corresponding to a communication method connected with the at least one first external electronic device in the memory.

A method for processing an IP multimedia subsystem (IMS)-based call in an electronic device according to any one of various embodiments may include registering the electronic device to an IMS server, identifying a short-range communication method capable of a device to device (D2D) connection with at least one first external electronic device, connecting, through the identified short-range communication method, to the at least one first external electronic device through at least one short-range communication module, based on identification information of the first external electronic device, and processing an IMS registration for the first external electronic device in response to an IMS registration request received from the first external electronic device through the at least one short-range communication module.

According to various embodiments, the method may include identifying a short-range communication method capable of the D2D connection with at least one first external electronic device in response to D2D service activation identification.

According to various embodiments, the D2D service activation identification may be identified by at least one of a product identification number of the electronic device, mobile country code (MCC)/mobile network code (MNC) information stored in a subscriber identification module (SIM), or public land mobile network (PLMN) information.

According to various embodiments, the short-range communication method may include at least one of Wi-Fi, Wi-Fi direct (WD), mobile hotspot, Bluetooth (BT), and Bluetooth low energy (BLE).

According to various embodiments, the method may include generating a transport layer security (TLS) server module corresponding to the IMS server in the electronic device in response to the connection with the at least one first external electronic device.

According to various embodiments, the method may include establishing a Wi-Fi direct group connection for a D2D service when the at least one first external electronic device does not exist in the same Wi-Fi network as the electronic device as a result of identifying the connectable short-range communication method, broadcasting advertisement data including information corresponding to the D2D service, and connecting with the first external electronic device through Wi-Fi Direct in response to receiving a message for group connection transmitted from at least one first external electronic device that has received the broadcasted advertisement data.

According to various embodiments, the information corresponding to the D2D service may include information corresponding to an external server that provides a call connection service.

According to various embodiments, the method may include connecting with the at least one first external electronic device through a Wi-Fi direct communication method in response to receiving an IMS call for a second external electronic device from the at least one first external electronic device.

According to various embodiments, the method may include processing an IMS registration for the first external electronic device in response to being connected with the at least one first external electronic device through a Wi-Fi direct communication method.

According to various embodiments, the method may include storing interface information corresponding to a communication method connected with the at least one first external electronic device in the memory.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStoreTM), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one antenna module;

at least one short-range communication module;

at least one processor connected to the antenna module and the at least one short-range communication module; and a memory connected to the at least one processor, wherein the memory is configured to store instructions which, when executed, cause the processor to:

register the electronic device to an IP multimedia subsystem (IMS) server through the at least one antenna module, identify a short-range communication method capable of a device to device (D2D) connection with at least one first external electronic device, connect, based on identification information of the at least one first external electronic device, with the at least one first external electronic device through the at least one short-range communication module with the identified short-range communication method, and process, using a transport layer security (TLS) server function corresponding to the IMS server in the electronic device, an IMS registration for the at least one first external electronic device in response to an IMS registration request received from the at least one first external electronic device through the at least one short-range communication module.

2. The electronic device of claim 1, wherein the instructions are configured to cause the processor to, identify the short-range communication method capable of the D2D connection with the at least one first external electronic device in response to a D2D service activation identification.

3. The electronic device of claim 2, wherein the D2D service activation identification is identified by at least one of a product identification number of the electronic device, a mobile country code (MCC)/mobile network code (MNC) information stored in a subscriber identification module (SIM), or a public land mobile network (PLMN) information.

4. The electronic device of claim 1, wherein the short-range communication method comprises at least one of Wi-Fi, Wi-Fi direct (WD), mobile hotspot, Bluetooth (BT), and Bluetooth low energy (BLE).

5. The electronic device of claim 1, wherein the instructions are configured to cause the processor to, establish a Wi-Fi direct group connection for a D2D service when the at least one first external electronic device does not exist in the same Wi-Fi network as the electronic device as a result of identifying the short-range communication method, broadcast advertisement data comprising information corresponding to the D2D service, and connect with the at least one first external electronic device through Wi-Fi Direct in response to receiving a message for group connection transmitted from the at least one first external electronic device that has received the advertisement data.

6. The electronic device of claim 5, wherein the electronic device further comprises a network service discovery module, and the network service discovery module is configured to, determine whether the at least one first external electronic device exists in the same Wi-Fi network as the electronic device.

7. The electronic device of claim 6, wherein the network service discovery module is configured to, receive only the BLE packet having an identifier configured by using a Bluetooth low energy (BLE) scan filter.

8. The electronic device of claim 6, wherein the network service discovery module is configured to, control to broadcast the advertisement data comprising information corresponding to the D2D service, and wherein the advertisement data comprises at least one of channel information of group owner or port information for authentication.

9. The electronic device of claim 5, wherein the information corresponding to the D2D service comprises information corresponding to an external server that provides a call connection service.

10. The electronic device of claim 1, wherein the instructions are configured to cause the processor to, connect with the at least one first external electronic device through a Wi-Fi direct communication method in response to receiving an IMS call for a second external electronic device from the at least one first external electronic device.

11. The electronic device of claim 10, wherein the instructions are configured to cause the processor to, process the IMS registration for the at least one first external electronic device in response to being connected with the at least one first external electronic device through the Wi-Fi direct communication method.

12. The electronic device of claim 1, wherein the instructions are configured to cause the processor to, store interface information corresponding to the short-range communication method connected with the at least one first external electronic device in the memory.

13. A method for processing an IP multimedia subsystem (IMS)-based call in an electronic device, the method comprising:

registering the electronic device to an IMS server;

identifying a short-range communication method capable of a device to device (D2D) connection with at least one first external electronic device;

connecting, based on identification information of the at least one first external electronic device, with the at least one first external electronic device through at least one short-range communication module with the identified short-range communication method; and processing, using a transport layer security (TLS) server function corresponding to the IMS server in the electronic device, an IMS registration for the at least one first external electronic device in response to an IMS registration request received from the at least one first external electronic device through the at least one short-range communication module.

14. The method of claim 13, further comprising, identifying a short-range communication method capable of the D2D connection with the at least one first external electronic device in response to a D2D service activation identification.

15. The method of claim 14, wherein the D2D service activation identification is identified by, at least one of a product identification number of the electronic device, a mobile country code (MCC)/mobile network code (MNC) information stored in a subscriber identification module (SIM), or a public land mobile network (PLMN) information.

16. The method of claim 13, wherein the short-range communication method includes, at least one of Wi-Fi, Wi-Fi direct (WD), mobile hotspot, Bluetooth (BT), and Bluetooth low energy (BLE).

17. The method of claim 13, further comprising, establishing a Wi-Fi direct group connection for a D2D service when the at least one first external electronic device does not exist in the same Wi-Fi network as the electronic device as a result of identifying the short-range communication method, broadcasting advertisement data including information corresponding to the D2D service, and connecting with the at least one first external electronic device through Wi-Fi Direct in response to receiving a message for group connection transmitted from the at least one first external electronic device that has received the advertisement data.

18. The method of claim 17, wherein the information corresponding to the D2D service includes information corresponding to an external server that provides a call connection service.

* * * * *